(12) United States Patent
Heath

(10) Patent No.: US 7,654,043 B2
(45) Date of Patent: Feb. 2, 2010

(54) RETROFIT ATTACHMENT YOKE

(75) Inventor: Richard W. Heath, Yorba Linda, CA (US)

(73) Assignee: Nibco Inc., Elkhart, IN (US)

( * ) Notice: Subject to any disclaimer, the term of this patent is extended or adjusted under 35 U.S.C. 154(b) by 194 days.

(21) Appl. No.: 10/909,257

(22) Filed: Jul. 30, 2004

(65) Prior Publication Data
US 2006/0024127 A1 Feb. 2, 2006

(51) Int. Cl.
E04B 1/98 (2006.01)
(52) U.S. Cl. ............... 52/167.3; 248/317; 403/150
(58) Field of Classification Search ............ 403/150, 403/151, 395, 397, 398, 399, 13, 408.1; 248/63, 317; 411/539; 52/167.3; 24/31 R, 24/31 F, 31 H, 33 R, 33 P, 33 B, 33 F, 37
See application file for complete search history.

(56) References Cited

U.S. PATENT DOCUMENTS

| | | | |
|---|---|---|---|
| 545,775 A | 9/1895 | Clark | |
| 665,274 A | 1/1901 | Seaman | |
| 768,122 A | 8/1904 | Hamilton et al. | |
| 1,026,396 A | 5/1912 | Hutton | |
| 1,073,679 A | 9/1913 | Haussman | |
| 1,082,993 A | 12/1913 | Beattie | |
| 1,132,999 A | 3/1915 | Beers | |
| 1,241,126 A | 9/1917 | Kidd | |
| 1,289,995 A | 12/1918 | Wrage | |
| 1,832,996 A | 11/1931 | Percival et al. | |
| 2,069,163 A | 1/1937 | Hibner, Jr. | |
| 2,477,855 A * | 8/1949 | Beach .................. | 24/33 B |
| 2,865,591 A | 12/1958 | Holinshead | |
| 2,907,812 A | 10/1959 | Sorflaten et al. | |
| 2,918,520 A | 12/1959 | Stevens | |
| 3,047,263 A | 7/1962 | Mittenzwei | |
| 3,177,542 A | 4/1965 | James | |
| 3,497,249 A | 2/1970 | Du Bois | |
| 3,792,829 A | 2/1974 | Fickett | |
| 3,841,196 A | 10/1974 | Tinnerman | |
| 4,014,504 A | 3/1977 | Sachs | |
| 4,029,276 A | 6/1977 | Zielie | |
| 4,036,546 A | 7/1977 | Thompson et al. | |
| 4,065,218 A | 12/1977 | Biggane | |

(Continued)

FOREIGN PATENT DOCUMENTS

DE 1274708 8/1968

OTHER PUBLICATIONS

Fig. 981, Fast Attach—Universal Swivel Sway Brace attachment, Tolco Catalog, May 10, 2001, 1 page.

(Continued)

Primary Examiner—Michael P Ferguson
(74) Attorney, Agent, or Firm—Knobbe Martens Olson & Bear LLP

(57) ABSTRACT

The invention relates to a retrofit connector for fast attachment to an existing system that supports a suspended load below a ceiling, beam or floor without the need to disassemble or disconnect any components of the system. Advantageously, the connector is easy to install and inexpensive to manufacture. The connector is removably or permanently attachable to a sway brace clamp or attachment to form a pivotable connector-clamp assembly. The assembly is capable of reliably supporting heavy loads against adverse sway and seismic disturbances.

8 Claims, 18 Drawing Sheets

U.S. PATENT DOCUMENTS

| | | | |
|---|---|---|---|
| 4,078,752 A | 3/1978 | Kindorf | |
| 4,132,146 A | 1/1979 | Uhlig | |
| 4,213,589 A | 7/1980 | Pierron et al. | |
| 4,455,716 A | 6/1984 | Leonardo | |
| 4,475,843 A | 10/1984 | Wyler | |
| 4,501,400 A | 2/1985 | Leonardo | |
| 4,524,936 A | 6/1985 | Hurtubise | |
| 4,624,374 A | 11/1986 | Murtaugh | |
| 4,696,459 A | 9/1987 | Woltron et al. | |
| 4,735,386 A | 4/1988 | Richards | |
| 4,746,239 A * | 5/1988 | Marquardt | 403/408.1 |
| 4,783,029 A | 11/1988 | Geppert et al. | |
| 4,799,444 A | 1/1989 | Lisowski | |
| 4,860,980 A | 8/1989 | Michot | |
| 4,895,338 A | 1/1990 | Froutzis | |
| 5,024,404 A | 6/1991 | Ballard | |
| 5,024,405 A | 6/1991 | McGuire | |
| 5,039,048 A | 8/1991 | Paxton | |
| 5,145,132 A | 9/1992 | Kirschner | |
| 5,188,317 A | 2/1993 | Roth | |
| 5,307,752 A | 5/1994 | Perrault et al. | |
| 5,412,843 A | 5/1995 | Krongauz et al. | |
| 5,413,063 A | 5/1995 | King | |
| D365,512 S | 12/1995 | Mason | |
| 5,683,115 A | 11/1997 | Hill | |
| 5,699,993 A | 12/1997 | Hill et al. | |
| 5,704,816 A | 1/1998 | Polidori | |
| 6,050,035 A | 4/2000 | Thompson et al. | |
| 6,247,274 B1 | 6/2001 | Thompson et al. | |
| 6,273,372 B1 | 8/2001 | Heath | |
| 6,415,560 B1 * | 7/2002 | Rinderer | 52/167.1 |
| 6,421,965 B2 | 7/2002 | Thompson et al. | |
| 6,517,030 B2 | 2/2003 | Heath | |
| RE38,075 E | 4/2003 | Thompson et al. | |
| 6,588,713 B2 | 7/2003 | Kilkenny | |
| 6,708,930 B2 | 3/2004 | Heath | |
| 6,726,159 B2 | 4/2004 | Brake | |
| 6,820,569 B2 | 11/2004 | Warfel et al. | |
| 6,837,009 B1 * | 1/2005 | Roth | 52/167.1 |
| 6,896,226 B2 * | 5/2005 | Heath | 248/62 |
| 6,953,174 B2 | 10/2005 | Heath | |
| 7,097,141 B2 | 8/2006 | Heath | |
| 2004/0031887 A1 | 2/2004 | Heath | |
| 2004/0031896 A1 | 2/2004 | Heath | |
| 2005/0133680 A1 | 6/2005 | Heath | |
| 2005/0189452 A1 | 9/2005 | Heath | |

OTHER PUBLICATIONS

Fig. 990 —Cable Sway Brace Attachment, Tolco (a brand of Nibco) Catalog, Revision Aug. 30, 2002, 1 page.
Erico Caddy Fasteners, Snap In Nut (Part No. ISN376) and Strut Plate Fitting (Part No. ISSP375), © 2003, 2 pages.

* cited by examiner

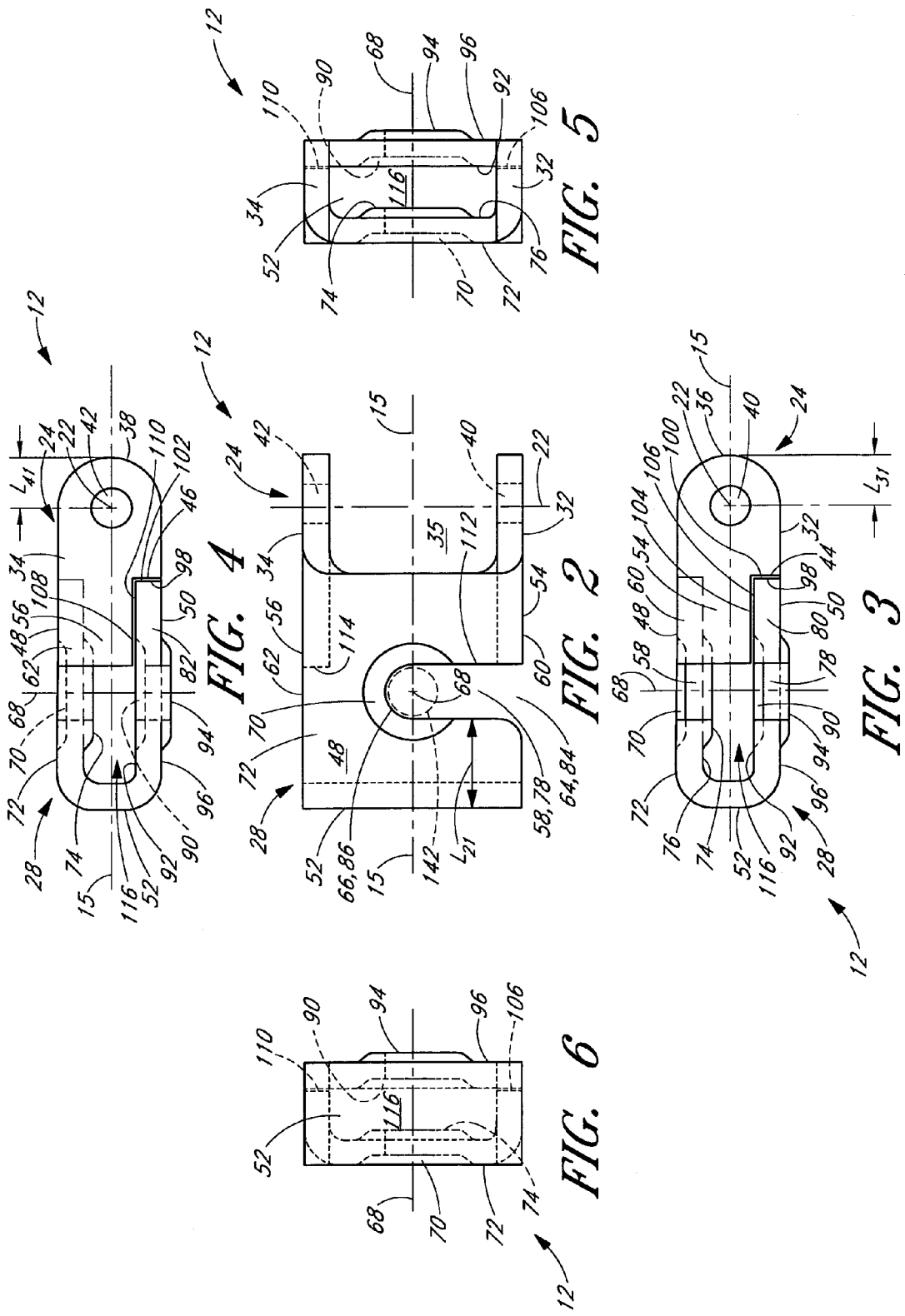

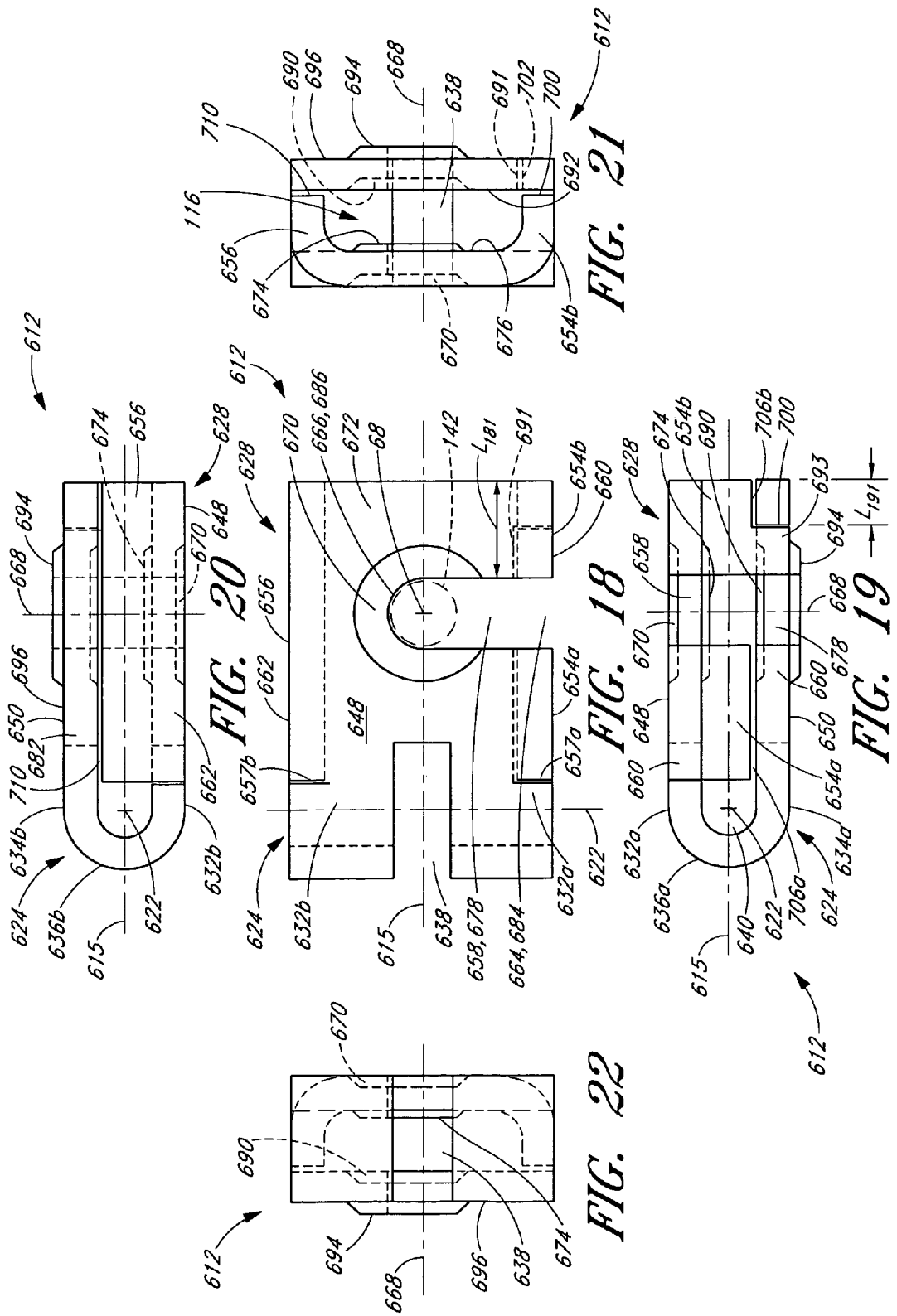

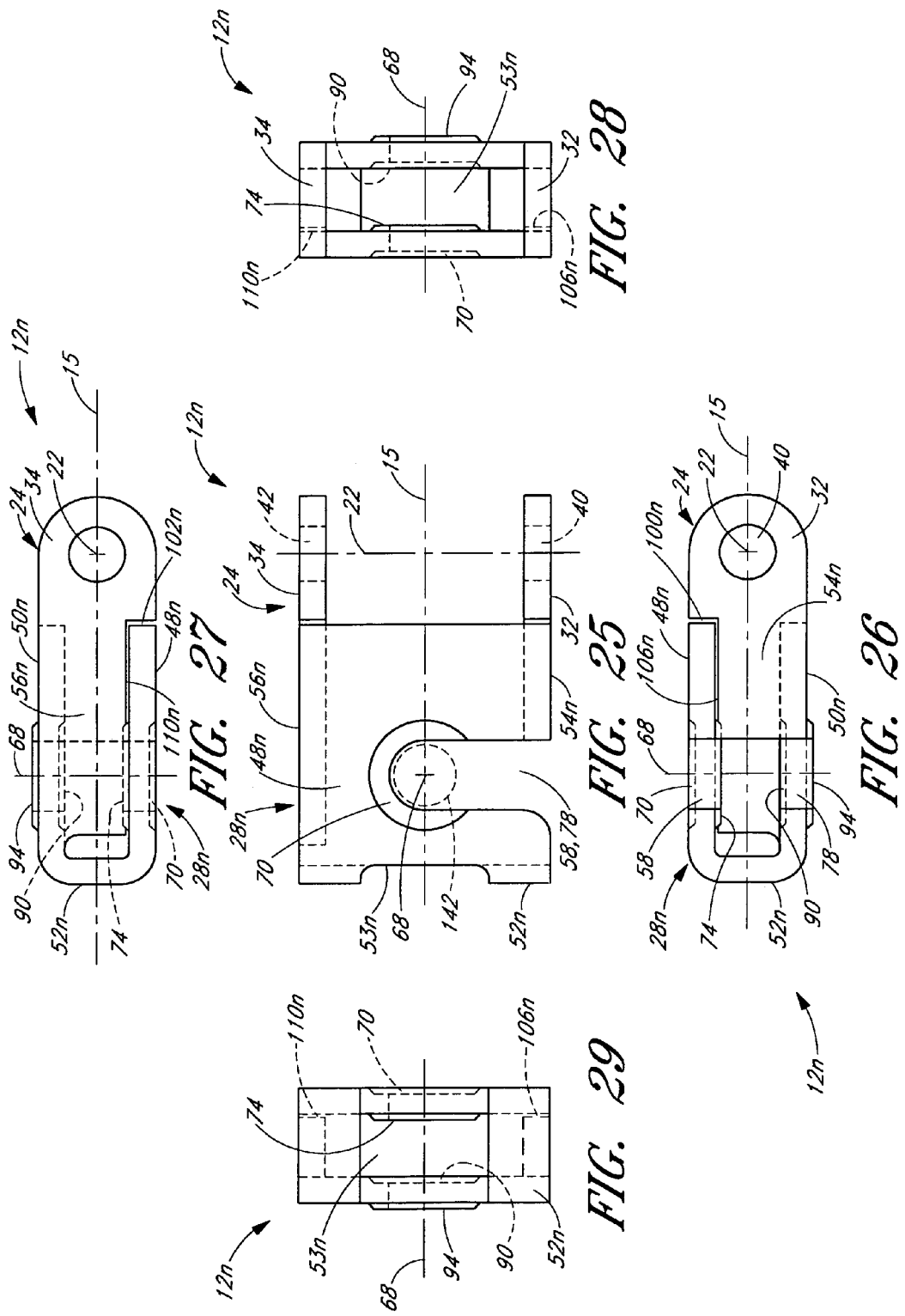

RETROFIT ATTACHMENT YOKE

BACKGROUND OF THE INVENTION

1. Field of the Invention

The invention relates generally to devices for bracing pipes and other loads suspended below ceilings, floors, beams and the like, against sway and seismic disturbances, and in particular to a retrofit connector assembly that permits fast attachment to hanger rods and the like of an existing installation without the need for disassembly.

2. Description of the Related Art

There are many products and assemblies thereof utilized by building, plumbing and electrical contractors for bracing and supporting pipes, ducts, sprinkler systems, fans, air-conditioners, electrical cables, communication lines and other loads from ceilings, beams and floors. These products include clamps, braces, cables, hooks, straps, hangers, plates, brackets, among other items.

In many instances, a clamp is used to connect one end of a brace, such as a bracing pipe or bracing cable, to a suspended load while the other end is connected to an overlying supporting surface such as a ceiling, beam or floor. Typically, the clamp is connected to a rod extending below the supporting surface and attached to it. The other end of the rod is connected to a hanger or other element supporting the suspended load.

In some cases, the rod must be disconnected from the hanger which is thereby removed from the load before the clamp can be connected to the rod. The various items are then reconnected or reassembled. Disadvantageously, this adds to the time and labor involved in the installation, and hence to the cost of the installation. Moreover, and undesirably, many conventional connectors used to attach the clamp to the rod can be expensive, difficult to install and not capable of reliably sustaining heavy loads.

SUMMARY OF THE INVENTION

It is one advantage of the invention to provide a retrofit connector for fast attachment to an existing system supporting a suspended load below a ceiling, beam or floor without the need to disassemble or disconnect any components of the system. Advantageously, the connector is easy to install and inexpensive to manufacture. The connector is removably or permanently attachable to a sway brace clamp or attachment to form a connector-clamp assembly. The assembly is capable of reliably supporting heavy loads against adverse sway and seismic disturbances.

One embodiment relates to a seismic connector for retrofit attachment to a support element of an installation. The connector generally comprises a proximal section, a generally flat upper wall, a generally flat lower wall and a recess. The proximal section is pivotally attachable to a device for connection to a brace. The upper wall has a first slot with a first open end and a first closed end. The lower wall is substantially parallel to the upper wall and spaced from the upper wall to form a gap therebetween. The lower wall has a second slot with a second open end and a second closed end. The slots, the open ends and the closed ends are substantially aligned with one another for receiving the support element. The recess is on the upper wall for mating with a nut engaged with the support element. The proximal section, the upper wall and the lower wall form an integral unit.

Another embodiment relates to a seismic connector for retrofit attachment to a support element of an installation. The connector generally comprises a proximal section, a generally flat upper wall, a generally flat upper wall and a recess on said upper wall. The proximal section is pivotally attachable to a device for connection to a brace. The upper wall has a first slot with a first open end and a first closed end. The lower wall is substantially parallel to the upper wall and spaced from the upper wall to form a gap therebetween. The lower wall has a second slot with a second open end and a second closed end. The slots, the open ends and the closed ends are substantially aligned with one another for receiving the support element. The recess is adapted for mating with a nut engaged with the support element. The proximal section, the upper wall and the lower wall form an integral unit.

Yet another embodiment relates to a retrofit connector that generally comprises a pair of spaced first and second jaws. The first and second jaws have a respective first and second slot. The slots are aligned with one another for receiving a rod of an installation. At least one of the jaws has a recess proximate to a corresponding one of the slots. The recess comprises a tapered side wall for interlocking with a nut movable along the rod.

One embodiment relates to a sway brace assembly. The assembly generally comprises a connector for retrofit attachment to a rod extending from a support surface and an attachment device. The connector generally comprises a proximal section, a first wall, a second wall, a recess and a side wall. The proximal section sized and configured to receive a connector pin. The first wall has a first slot extending from a first side edge. The second wall has a second slot extending from a second side edge and substantially aligned with the first slot for receiving the rod. The recess has a closed bottom face for matingly locking with a nut threadably movable along the rod. The side wall extends between the first and second walls to space the first and second walls. The side wall is slightly spaced from the first wall and mechanically connected to the second wall. The attachment device is coupled to the connector for attaching the connector to a brace.

One embodiment relates to a method of manufacturing a retrofit attachment connector. The method includes providing a generally flat strip of material. The strip is stamped to form a generally T-shaped plate with a first main wall having a first slot with a first open end and a first closed end and a second main wall spaced from said first wall and having a second slot with a second open end and second closed end. A recess is coined and substantially circumscribes one of the closed ends of the slots for receiving a nut of an existing installation. The plate is bent at a location intermediate the main walls by a predetermined angle to substantially align the slots for receiving a rod of the existing installation.

One embodiment relates to a method of retrofittingly attaching a seismic connector to a rod of an already existing support installation without requiring disassembly of the installation. The installation generally comprises the rod extending from a support surface and attached to a hanger supporting a suspended load. The method includes substantially laterally sliding the connector to capture the rod in a pair of substantially fixedly aligned slots of the connector so that the rod abuts against or is proximate to generally curved closed ends of the slots. The slots have perimeters which are substantially coincident with one another and substantially perpendicular to the rod. A nut threadably engaged with the rod is rotated in a direction towards the connector. The nut is tightened such that it contacts the connector and matingly interlocks in a recess of the connector so that the connector and the rod are securingly coupled.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 2 is a simplified top view of the retrofit connector of FIG. 1 illustrating features and advantages in accordance with one embodiment of the invention.

FIG. 3 is a simplified side view of the retrofit connector of FIG. 1 illustrating features and advantages in accordance with one embodiment of the invention.

FIG. 4 is a simplified opposite side view of the retrofit connector of FIG. 1 illustrating features and advantages in accordance with one embodiment of the invention.

FIG. 5 is a simplified proximal end view of the retrofit connector of FIG. 1 illustrating features and advantages in accordance with one embodiment of the invention.

FIG. 6 is a simplified distal end view of the retrofit connector of FIG. 1 illustrating features and advantages in accordance with one embodiment of the invention.

FIG. 18 is a simplified top view of the retrofit connector of FIG. 17 illustrating features and advantages in accordance with one embodiment of the invention.

FIG. 19 is a simplified side view of the retrofit connector of FIG. 17 illustrating features and advantages in accordance with one embodiment of the invention.

FIG. 20 is a simplified opposite side view of the retrofit connector of FIG. 17 illustrating features and advantages in accordance with one embodiment of the invention.

FIG. 21 is a simplified distal end view of the retrofit connector of FIG. 17 illustrating features and advantages in accordance with one embodiment of the invention.

FIG. 22 is a simplified proximal end view of the retrofit connector of FIG. 17 illustrating features and advantages in accordance with one embodiment of the invention.

FIG. 25 is a simplified top view of the retrofit connector of FIG. 24 illustrating features and advantages in accordance with one embodiment of the invention.

FIG. 26 is a simplified side view of the retrofit connector of FIG. 24 illustrating features and advantages in accordance with one embodiment of the invention.

FIG. 27 is a simplified opposite side view of the retrofit connector of FIG. 24 illustrating features and advantages in accordance with one embodiment of the invention.

FIG. 28 is a simplified proximal end view of the retrofit connector of FIG. 24 illustrating features and advantages in accordance with one embodiment of the invention.

FIG. 29 is a simplified distal end view of the retrofit connector of FIG. 24 illustrating features and advantages in accordance with one embodiment of the invention.

DETAILED DESCRIPTION OF THE PREFERRED EMBODIMENTS

Figure 1:
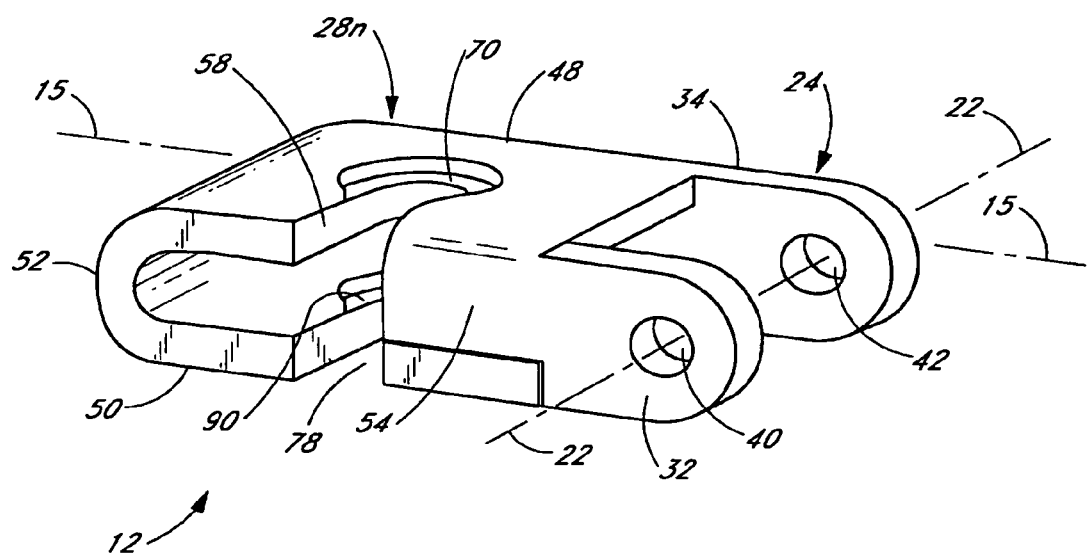
FIG. 1 is a simplified perspective view of a retrofit connector illustrating features and advantages in accordance with one embodiment of the invention.

The preferred embodiments of the invention described herein relate generally to devices for bracing pipes and other loads suspended from or below ceilings, floors, beams, walls and the like, against sway and seismic disturbances and, more particularly, to a retrofit connector and assembly that permits fast attachment to hanger rods and the like of an existing installation without the need for disassembly and which can reliably sustains heavy loads.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

In accordance with some embodiments, a retrofit connector is provided for attachment to an existing system supporting a suspended load below a ceiling, beam, floor or the like without the need to disassemble or disconnect any components of the system, thereby allowing for efficient retrofitting. The connector is easy to install and inexpensive to manufacture. The connector is removably or permanently attachable to a sway brace clamp or attachment to form a connector-clamp assembly. The assembly is capable of reliably supporting heavy loads against adverse sway and seismic disturbances.

FIGS. 1-6 show different views of one embodiment of a retrofit attachment connector or yoke 12. The retrofit yoke or connector 12 has a generally longitudinal axis 15 and is preferably rotatable, pivotable or swivelable about a rotation, pivot or swivel axis 22 with the axes 15 and 22 being generally perpendicular to one another. As discussed in greater detail later herein, the seismic earthquake brace connector 12 is attachable to a rod or bolt of an already installed system supporting a suspended load, such as a pipe and the like, without disassembly of the existing system.

The retrofit connector 12 (FIGS. 1-6) is attachable to a wide variety of suitable clamps, fittings, attachments, yokes and the like, some of which are disclosed later herein. These clamps or devices are securely attachable to a brace, such as a bracing pipe, bracing cable and the like, to protect the suspended load against adverse sway and seismic disturbances.

Several suitable clamps, fittings, attachments, yokes and devices which may be efficaciously attached to the retrofit connector or yoke 12 (and several installation arrangements) are disclosed in U.S. Pat. No. 6,273,372 B1, issued Aug. 14, 2001, U.S. Pat. No. 6,517,030 B2, issued Feb. 11, 2003, U.S. Pat. No. 6,708,930 B2, issued Mar. 23, 2004, all three entitled SWAY BRACE FITTING, U.S. patent application Ser. No. 10/260,473, filed Sep. 26, 2002, U.S. Publication No. 2004/0031896 A1, published Feb. 19, 2004, entitled SWAY BRACE CLAMP AND CONNECTOR ASSEMBLY, and U.S. patent application Ser. No. 10/255,950, filed Sep. 26, 2002, U.S. Publication No. 2004/0031887 A1, published Feb. 19, 2004, entitled BRACE CLAMP AND CONNECTOR ASSEMBLY, the entirety of each one of which is hereby incorporated by reference herein. The skilled artisan will appreciate that the retrofit connector 12 may efficaciously be used in conjunction with a wide variety of other suitable clamps, fittings, attachments, devices and the like.

In the illustrated embodiment of FIGS. 1-6, the retrofit connector 12 is generally in the form of a curved and/or bent plate with a plurality of angled and spaced walls or surfaces. The connector 12 generally comprises a proximal or base portion or section 24 which connects to a clamp or the like and a distal or main body portion or section 28 which connects to a threaded rod or the like of an installation.

In the illustrated embodiment of FIGS. 1-6, the proximal portion 24 generally comprises a pair of spaced and substantially parallel side walls 32, 34 which extend generally vertically and generally parallel to the longitudinal axis 15 and generally perpendicular to the rotation axis 22 and a gap 35 therebetween for receiving an attachment device, as discussed further below. In the illustrated embodiment, the side walls 32 and 34 have substantially the same structure. Each of the side walls 32, 34 has a generally rounded or curved respective proximal end 36, 38 (see, for example, FIGS. 3 and 4) though in modified embodiments other suitable shapes may be efficaciously utilized, as needed or desired.

In the illustrated embodiment of FIGS. 1-6, and as best seen in FIGS. 1-4, the first wall 32 has a hole or through cavity 40 and the second wall 34 has a hole or through cavity 42. The holes 40, 42 are substantially aligned with one another and form part of a passage that receives a pin or the like (as discussed below) to attach the retrofit connector 12 to a clamp or other device. The rotation axis 22 passes generally through the center of the holes 40, 42. In the illustrated embodiment, the holes 40, 42 are generally circular (see, for example, FIGS. 3 and 4) though in modified embodiments other suitable shapes may be efficaciously utilized, as needed or desired.

In the illustrated embodiment of FIGS. 1-6, and referring in particular to FIGS. 3 and 4, each of the side walls 32, 34 has a generally vertical lower flat surface or end 44, 46, respectively, which is proximate to and/or abuts against a portion of the distal portion 28. In the illustrated embodiment, the proximal portion 24 and the distal portion 28 are integrally connected to form an integral unit though in modified embodiments they may be comprise individual or independent components that are attached to one another. The proximal portion 24 and the distal portion 28 are mechanically connected or in mechanical communication with one another.

In the illustrated embodiment of FIGS. 1-6, the distal or main body portion 28 generally comprises a pair of generally horizontal walls or jaws 48, 50 spaced by a distal end wall 52 and a pair of generally vertical side walls 54, 56 spaced by the horizontal wall 48. The upper wall 48 and lower wall 50 extend substantially parallel to one another. The end wall 52 extends generally perpendicular to the longitudinal axis 15 and generally parallel to the rotation axis 22. The side walls 54, 56 are generally parallel to one another and extend generally parallel to the longitudinal axis 15 and generally perpendicular to the rotation axis 22.

In the illustrated embodiment of FIGS. 1-6, the walls 48, 50, 52, 54 and 56 are generally rectangular in shape. In the illustrated embodiment, the upper and lower walls 48 and 50 have substantially the same structure and the side walls 54 and 56 have substantially the same structure.

In the illustrated embodiment of FIGS. 1-6, and as best seen in FIGS. 1 and 2, the upper wall 48 has a slot 58 which extends from a side edge 60 towards an opposite side edge 62. The slot 58 is generally U-shaped and has a rectangular portion and a curved or rounded portion. The slot 58 includes an open end 64 and a generally rounded closed end 66 in the form of a half- or semi-circle. As discussed further below, the slot 58 is sized and configured to receive (for example, by substantially laterally slidingly) a threaded rod or bolt of an installation.

In the illustrated embodiment of FIGS. 1-6, the upper wall 48 is oriented generally perpendicular to the proximal portion side walls 32, 34. A line passing through the center of the imaginary full circle formed by the half- or semi-circle of the slot closed end 66 is referred to herein as the longitudinal axis 68 of the slot 58 or of its rod- or bolt-receiving cavity or portion. In the illustrated embodiment, the slot longitudinal axis 68 is generally perpendicular to the connector longitudinal axis 15 and the rotation axis 22.

In the illustrated embodiment of FIGS. 1-6, the upper wall 48 has a recess, cavity or pocket 70 at its upper surface 72 and a corresponding protrusion 74 at its lower surface 76. As discussed further below, in one embodiment, a "coining" operation is utilized to form the recess 70 and the resulting protrusion 74. As also discussed further below, the recess 70 is sized and configured to provide clearance space for and to form an interference fit with a nut used to secure the connector 12 to a threaded rod or bolt of an installation. The nut matingly interlocks with the recess 70. In the illustrated embodiment, the recess 70 and protrusion 74 have tapered or angled side walls.

In the illustrated embodiment of FIGS. 1-6, and as best seen in FIGS. 1 and 2, the recess 70 is generally semi-circular in shape and circumscribes the slot closed end 66 and extends towards the slot open end 64. The diameter of the imaginary full circle formed by the semi-circular recess 70 is larger than the diameter of the imaginary full circle formed by the semi-circular slot closed end 66. A line passing through the center of the imaginary full circle formed by the semi-circular recess 70 is substantially the same as or coincident with the slot longitudinal axis 68.

In the illustrated embodiment of FIGS. 1-6, the protrusion 74 is generally semi-circular in shape and circumscribes the slot closed end 66 and extends towards the slot open end 64. In some embodiments, the diameter of the imaginary full circle formed by the semi-circular protrusion 74 is slightly larger than the diameter of the imaginary full circle formed by the semi-circular recess 70. A line passing through the center of the imaginary full circle formed by the semi-circular protrusion 74 is substantially the same as or coincident with the slot or recess longitudinal axis 68.

In the illustrated embodiment of FIGS. 1-6, the lower wall 50 has a slot 78 which extends from a side edge 80 towards an opposite side edge 82. The upper and lower slots 58 and 78 are substantially identical in shape and aligned with one another. The slot 78 is generally U-shaped and has a rectangular portion and a curved or rounded portion. The slot 78 includes an open end 84 and a generally rounded closed end 86 in the form of a half- or semi-circle. As discussed further below, the slot 78 (and slot 58) is sized and configured to receive (for example, by substantially laterally slidingly) a threaded rod or bolt of an installation.

In the illustrated embodiment of FIGS. 1-6, the slots 58, 78 open with respective open ends 64, 84 at respective side edges 60, 80. In another embodiment, the slots 58, 78 can open with respective open ends 64, 84 at opposite respective side edges 62, 82 (see, for example, FIG. 8).

In the illustrated embodiment of FIGS. 1-6, the lower wall 50 is oriented generally perpendicular to the proximal portion side walls 32, 34. A line passing through the center of the imaginary full circle formed by the half- or semi-circle of the slot closed end 86 is substantially the same as or coincident with the longitudinal axis 68 (discussed above). In the illustrated embodiment, also as indicated above, the slot longitudinal axis 68 is generally perpendicular to the connector longitudinal axis 15 and the rotation axis 22.

In the illustrated embodiment of FIGS. 1-6, the lower wall 50 has a recess, cavity or pocket 90 at its upper surface 92 and a corresponding protrusion 94 at its lower surface 96. As discussed further below, in one embodiment, a "coining" operation is utilized to form the recess 90 and the resulting protrusion 94. As also discussed further below, the protrusion 94 is sized and configured to allow for improved mating between two of the connectors 12, for example, in a stacked configuration with one on top of the other. In the illustrated embodiment, the recess 90 and protrusion 94 have tapered or angled side walls.

In a modified embodiment, the recess 90 may be sized and configured to provide clearance space for and to form an interference fit with a nut used to secure the connector 12 to a threaded rod or bolt of an installation. This may be accomplished by, for example, by configuring the side wall 54 so that it provides clearance space for allowing the nut to engage the recess 90.

In the illustrated embodiment of FIGS. 1-6, the recess 90 is generally semi-circular in shape and circumscribes the slot closed end 86 and extends towards the slot open end 84. The diameter of the imaginary full circle formed by the semi-circular recess 90 is larger than the diameter of the imaginary full circle formed by the semi-circular slot closed end 86. A line passing through the center of the imaginary full circle formed by the semi-circular recess 90 is substantially the same as or coincident with the slot longitudinal axis 68.

In the illustrated embodiment of FIGS. 1-6, the protrusion 94 is generally semi-circular in shape and circumscribes the slot closed end 86 and extends towards the slot open end 84. In some embodiments, the diameter of the imaginary full circle formed by the semi-circular protrusion 94 is slightly larger than the diameter of the imaginary full circle formed by the semi-circular recess 90. A line passing through the center of the imaginary full circle formed by the semi-circular protrusion 94 is substantially the same as or coincident with the slot or recess longitudinal axis 68.

In the illustrated embodiment of FIGS. 1-6, and as best seen FIGS. 3 and 4, the lower wall 50 has a proximal edge or end 98 which is proximate to and/or abuts against the lower flat surfaces or edges 44, 46 of the respective proximal walls 32, 34 to form respective gaps 100, 102. In some embodiments, the gaps 100, 102 are minimized and can be a result of some degree of "spring" back within the material of the connector 12, for instance, due to bending operations.

In the illustrated embodiment of FIGS. 1-6, the end or distal wall 52 is generally rectangular in shape and extends between and spaces the top and bottom walls 48 and 50. The end wall 52 is mechanically connected or in mechanical communication with the upper and lower walls 48 and 50. The end wall 52 is generally perpendicular to the walls 32, 34, 48, 50, 54 and 56.

In the illustrated embodiment of FIGS. 1-6, an as best seen in FIG. 2, the side walls 54, 56 are generally coplanar with respective proximal side walls 32, 34 and are generally parallel to the side walls 32, 34. The side wall 54 is mechanically connected to or in mechanical communication with the proximal side wall 32 (see, for example, FIG. 3) and the side wall 56 is mechanically connected to or in mechanical communication with the proximal side wall 34 (see, for example, FIG. 4). The side walls 54, 56 are generally perpendicular to the upper wall 48, the lower wall 50 and the end wall 52.

In the illustrated embodiment of FIGS. 1-6, and as best seen in FIGS. 3 and 4, the side walls 54, 56 are mechanically connected to or in mechanical communication with the upper wall 48. Referring in particular to FIG. 3, the side wall 54 has a lower edge or surface 104 which is proximate to and/or abuts the upper surface 92 of the lower wall 50 to form a gap 106. Referring in particular to FIG. 4, the side wall 56 has a lower edge or surface 108 which is proximate to and/or abuts the upper surface 92 of the lower wall 50 to form a gap 110. In some embodiments, the gaps 106, 110 are minimized and can be a result of some degree of "spring" back within the material of the connector 12, for instance, due to bending operations.

In the illustrated embodiment of FIGS. 1-6, the side walls 54, 56 are spaced from the end or distal wall 52 and extend towards it. The side wall 54 terminates at an edge 112 (see FIG. 2) of the slot 58. The side wall 56 terminates at a line 114 (see FIG. 2) generally coincident with the edge 112.

Advantageously, the arrangement of the various walls of the connector 12 (FIGS. 1-6) results in a gap or empty space 116 (see, for example, FIGS. 3-6). This reduces on the cost and amount of material used to fabricate the connector 12. Thus, the connector 12 is desirably lightweight and economical in cost.

In the illustrated embodiment of FIGS. 1-6, and referring in particular to FIGS. 1 and 2, the slots 58, 78 are sized and configured to receive a threaded rod or bolt of an installation. A rod or bolt 142 is shown in phantom in FIG. 2. The slots 58, 78 have a predetermined, preselected or prescribed width for receiving a rod 142 of a particular diameter. The curvature (or the diameter of an imaginary full circle) of the semi-circular slot ends 66, 86 is also predetermined, preselected or prescribed to generally correspond to or be slightly larger than the diameter of the rod 142. The longitudinal axis 68 generally corresponds to the longitudinal axis of the rod 142 and which is also generally perpendicular to the connector axis 15 and the rotation axis 22.

The connector 12 (FIGS. 1-6) is fabricated from a suitably strong material to meet the standards set by the Underwriters Laboratories (U.L.), Factory Mutual Engineering (F.M.), and other such quality control groups. Preferably, the connector 12 is fabricated from steel. In one embodiment, the connector 12 comprises a mild steel. In another embodiment, the connector 12 comprises a carbon steel. In modified embodiments, the connector 12 may be fabricated from other suitably strong materials such as other metals, alloys, ceramics, plastics, laminates, reinforced composites, combinations thereof and the like, as needed or desired.

The connector 12 (FIGS. 1-6) may be provided with a suitable surface treatment or coating to enhance its durability and/or appearance. In one embodiment, the connector 12 has a surface coating to provide an electro-galvanized finish.

In one embodiment, the retrofit connector 12 has a length of about 8.65 cm (3.406 inches), a width of about 5.31 cm (2.09 inches), a height of about 2.5 cm (1 inch), a length $L_{21}$ (see FIG. 2) of about 2.22 cm (0.875 inches) and a nominal material thickness of about 6.4 mm (0.25 inches). In modified embodiments, other suitable dimensions may be efficaciously utilized, as needed or desired.

In one embodiment, the proximal side walls 32, 34 have a length of about 2.86 cm (1.125 inches), lengths $L_{31}$ (see FIG. 3), $L_{41}$ (see FIG. 4) of about 1.27 cm (0.5 inches) and the proximal holes 40, 42 have a diameter of about 1.03 cm (0.406 inches). In modified embodiments, other suitable dimensions may be efficaciously utilized, as needed or desired.

In one embodiment, the radii of curvature where the side walls 32, 34, 54, 56 meet the top wall 48 and where the distal end wall 52 meets the top and bottom walls 48, 50 are about 4 mm (0.156 inches). In modified embodiments, other suitable dimensions may be efficaciously utilized, as needed or desired.

The width of the slots 58, 78 is customizable to engage different size hanger rods (e.g. rod 142) with a suitably small tolerance fit. In one embodiment, the slots 58, 78 can accommodate rod sizes or diameters in the range from about 0.95 cm (0.375 inches) to about 1.91 cm (0.75 inches). In modified embodiments, the slots 58, 78 may be dimensioned to accommodate larger or smaller rod sizes with efficacy, as needed or desired.

In one embodiment, the slots 58, 78 have a width of about 1.35 cm (0.531 inches). In another embodiment, the slots 58, 78 have a width in the range from about 1 cm (0.4 inches) to about 2 cm (0.8 inches), including all values and sub-ranges therebetween. In yet another embodiment, the slots 58, 78 have a width in the range from about 0.5 cm (0.2 inches) to about 2.5 cm (1 inch), including all values and sub-ranges therebetween. In modified embodiments, other suitable dimensions may be efficaciously utilized, as needed or desired.

The size of the top recess 70 is customizable to engage different sizes of a nut of an installation and desirably form an interference fit when the nut is tightened. In one embodiment, the recesses 70, 90 have a depth of about 2.36 mm (0.093 inches) and a diameter of about 2.38 cm (0.937 inches). In another embodiment, the recesses 70, 90 have a depth in the range from about 1 mm to about 5 mm and a diameter in the range from about 1 cm to about 5 cm, including all values and sub-ranges therebetween. In modified embodiments, other suitable dimensions may be efficaciously utilized, as needed or desired.

In one embodiment, the protrusions 74, 94 have a depth and diameter substantially the same as corresponding recesses 70, 90. In another embodiment, the protrusions 74, 94 have a diameter slightly larger than that of corresponding recesses 70, 90. In modified embodiments, other suitable dimensions may be efficaciously utilized, as needed or desired.

In one embodiment, the gaps 100, 102 have a size of about 1.6 mm ($\frac{1}{16}^{th}$ of an inch). In another embodiment, the gaps 100, 102 have a size in the range from about 0.8 mm ($\frac{1}{32}^{nd}$ of an inch) to about 3.2 mm ($\frac{1}{8}^{th}$ of an inch), including all values and sub-ranges therebetween. In modified embodiments, other suitable dimensions may be efficaciously utilized, as needed or desired.

In one embodiment, the gaps 106 and 110 have a size of about 1.6 mm ($\frac{1}{16}^{th}$ of an inch). In another embodiment, the gaps 106 and 110 have a size in the range from about 0.8 mm ($\frac{1}{32}^{nd}$ of an inch) to about 3.2 mm ($\frac{1}{8}^{th}$ of an inch), including all values and sub-ranges therebetween. In modified embodiments, other suitable dimensions may be efficaciously utilized, as needed or desired.

In some embodiments, the retrofit connector 12 advantageously provides a visual verification of proper installation torque. During installation, tightening of an existing nut on the hanger rod (e.g., rod 142) substantially completely closes the small gaps 106, 110 to indicate proper torque installation. The lower wall 50 is displaced (and/or the upper wall 48) to close the gaps 106, 110 on application of a predetermined torque or force.

In embodiments of a stacked configuration of connectors 12, closure of one or both sets of gaps 106, 110 can be used as a visual indicator of proper installation torque. In a modified embodiment, closure of a small gap between stacked connectors 12 may be used as a visual indicator of proper installation torque.

The connector 12 (FIGS. 1-6) of embodiments of the invention can be manufactured or fabricated by a wide variety of methods and/or technologies. These include, without limitation, stamping/punching, casting, molding, forging, machining, combinations thereof, among others.

Figure 7:
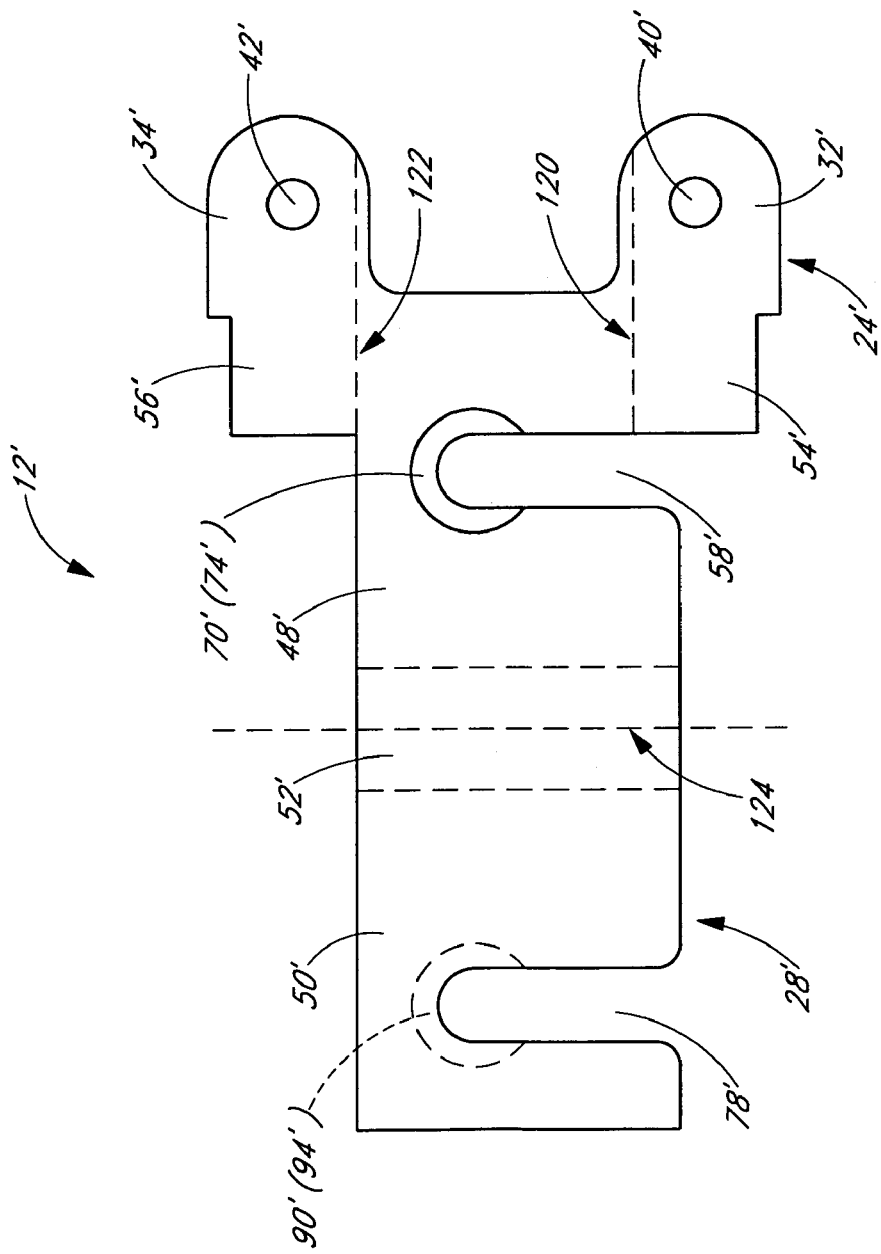
FIG. 7 is a simplified depiction of some acts during manufacture of the retrofit connector of FIG. 1 illustrating features and advantages in accordance with one embodiment of the invention.

In one embodiment, and referring in particular to FIG. 7, the connector 12 is manufactured by stamping a generally flat strip of material. Preferably, the material comprises a metal, such as mild steel or carbon steel. A suitable cutting-die is used to perform the stamping operations and the like.

In the illustrated embodiment of FIG. 7, a strip (e.g. rectangular or the like) is stamped into a generally T-shaped plate 12' with a proximal portion 24' and a distal or main body portion 28'. In FIG. 7, elements with primed reference numerals correspond to associated elements of the connector 12 (FIGS. 1-6).

Referring in particular to FIG. 7, the stamping or blanking includes forming side walls, sections or portions 32', 34', side walls, sections or portions 54', 56', distal wall, section or portion 52' and main walls, sections or portions 48', 50'. In one embodiment, the stamping includes forming slots 58', 78'. In another embodiment, the slots 58', 78' are formed by punching which is an independent step, either simultaneous with the stamping or before or after the stamping.

In one embodiment, the stamping includes the step of punching holes 40', 42'. In another embodiment, the holes 40', 42' are formed by punching which is an independent step, either simultaneous with the stamping or before or after the stamping.

Still referring in particular to FIG. 7, the recesses 70', 90' are formed by coining which also creates the corresponding protrusions 74', 94'. In one embodiment, coining is the squeezing of metal or other material while it is confined in a closed set of dies to form the desired features, for example, by the action of a punch.

In the illustrated embodiment of FIG. 7, the plate 12' is bent by a predetermined angle (in this case, about 90°) around or about predetermined lines, axes or bands 120 and 122 to form the proximal portion side walls 32, 34 with corresponding aligned holes 40, 42 and distal portion side walls 54, 56. The plate 12' is also bent by a predetermined angle (in this case, about 180°) around or about a predetermined line, axis or band 124 to form the distal end wall 52 and the distal portion upper and lower walls 48, 50 with corresponding aligned slots 58, 78. This bending operation around location 124 can also comprise two bending steps. For example, a first bend of about 90° to form the upper wall 48 and a second bend of about 90° to form the end wall 52 and the lower wall 50 and to align the upper and lower slots 58, 78.

The bending operations can result in some degree of spring-back though, in some embodiments, the spring-back is minimized. The associated bend allowance and bending pressure can be calculated for bending and forming operations. Alternatively, or in addition, test runs can be conducted to determine these values under realistic conditions.

As indicated above, the gaps 100, 102, 106, 110 (FIGS. 3 and 4) between the lower wall 50 and the side walls 32, 34, 54, 56 are, in some embodiments, minimized by utilizing suitable bending procedures. As also indicated above, in some embodiments, the gaps 106, 110 are utilized for visual verification of proper installation torque and substantially close when the retrofit connector 12 is installed.

This generally completes the construction of the connector 12 (FIGS. 1-6). The order of performing the steps to fabricate the connector 12 may not necessarily follow in the order discussed above, but may be selected in any suitable manner, as needed or desired. The retrofit connector or yoke 12 is subsequently connected to a suitable clamp or fitting, as needed or desired and as discussed further below.

Advantageously, the connector 12 (FIGS. 1-6) of some embodiments comprises an integral unit or yoke. Thus, a single cutting-die may be used to contour it to the desired shape as compared to having multiple dies to form discrete, and possibly differently shaped, pieces which would than require assembly. Advantageously, this saves on cost.

The manufacturing process or method of the illustrated embodiment of FIG. 7 is especially suited for automated assembly lines, wherein stamping, punching, coining and bending operations can be performed at high speeds and pick-and-place robotic arms or systems can be used to efficiently manipulate the workpieces. The simplicity and speed of this manufacturing method results in an end product that is economical to manufacture, and thus is desirably inexpensive. In a modified embodiment, the connector 12 is manufactured by casting or molding.

The utility and versatility of the retrofit connector 12 and other embodiments as taught or suggested herein will be readily apparent to those skilled in the art. As discussed in further detail below, the connector 12 is attachable to an existing system supporting a suspended load below a ceiling, beam, floor or the like without the need to disassemble or disconnect any components of the system, thereby allowing for efficient retrofitting. Advantageously, the connector 12 is easy to install and inexpensive to manufacture. The connector 12 is removably or permanently attachable to a sway brace clamp or attachment to form a connector-clamp assembly. The assembly is advantageously capable of reliably supporting heavy loads against adverse sway and seismic disturbances. Desirably, the connector 12 is easily installable and also easily removable. For example, it may be used in a new installation as well and subsequently be removed or replaced, as needed or desired.

The seismic retrofit connector 12 can be utilized in conjunction with a wide variety of fittings and clamps some of which are discussed herein and some are incorporated by reference herein. The skilled artisan will appreciate that the retrofit connector 12 may efficaciously be used in conjunction with a wide variety of other suitable clamps, fittings, attachments, devices and the like.

Figure 8:
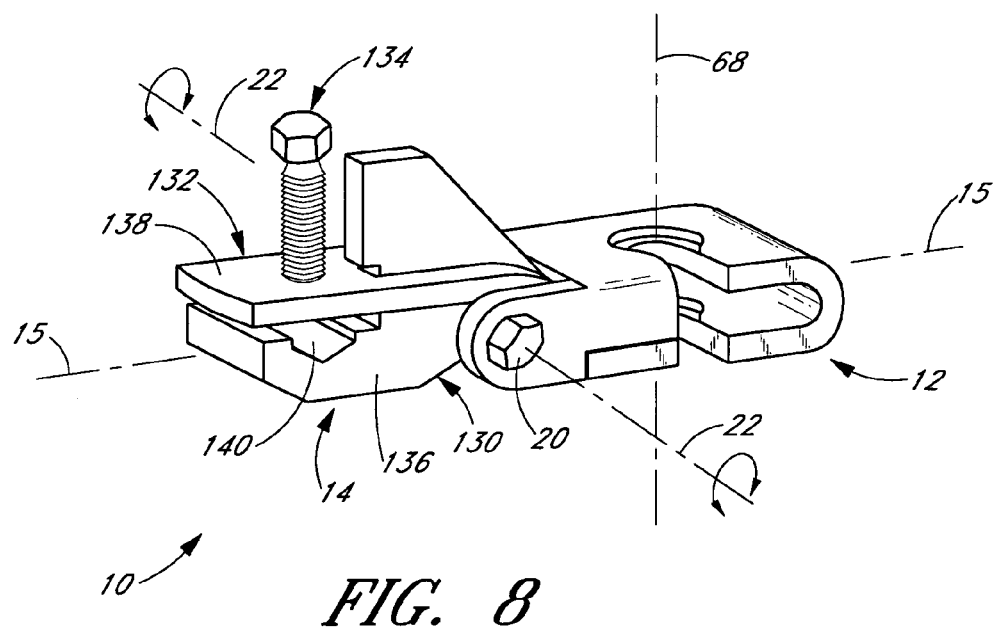
FIG. 8 is a simplified perspective view of an assembly generally comprising the retrofit connector of FIG. 1 and a sway brace clamp illustrating features and advantages in accordance with one embodiment of the invention.

In one preferred embodiment, and referring in particular to FIG. 8, a sway brace assembly 10 comprises the connector 12 mechanically connected to a sway brace clamp 14. Certain embodiments of the sway brace clamp or fitting 14 are described in U.S. Pat. No. 6,273,372 B1, issued Aug. 14, 2001, U.S. Pat. No. 6,517,030 B2, issued Feb. 11, 2003, and U.S. Pat. No. 6,708,930 B2, issued Mar. 23, 2004, the entirety of each one of which is hereby incorporated by reference herein.

The seismic earthquake brace connector 12 is attachable to a rod or bolt of an already installed system supporting a suspended load, such as a pipe and the like, without disassembly of the existing system. The clamp 14 is securely attachable to a brace, such as a bracing pipe and the like, to protect the suspended load against adverse sway and seismic disturbances. The assembly 10 and/or the connector 12 and/or the clamp 14 have a generally longitudinal axis 15.

Referring in particular to FIG. 8, the connector 12 is pivotable or swivelable about a fastener or pin 20 the longitudinal axis of which generally defines the rotation, pivot or swivel axis 22. The pin 20 mechanically connects or couples the connector 12 and the clamp 14. In the illustrated embodiment, the clamp longitudinal axis 15 is oriented substantially perpendicular to the rotation axis 22.

In the illustrated embodiment of FIG. 8, advantageously, the hinged connection or coupling between the connector 12 and clamp 14 allows the orientation and/or angulation between the connector 12 and clamp 14 to be adjusted or selected, as needed or desired. Preferably, both the connector 12 and clamp 14 are rotatable about the rotation axis 22 though in modified embodiments only one may be, as needed or desired.

Similarly, for other embodiments disclosed or suggested herein which utilize such a or similar or equivalent hinged connection, the orientation and/or angulation between the two hingedly attached components (e.g. connector and clamp or other attachment devices) can advantageously be adjusted or selected, as needed or desired. Preferably, both components are rotatable about the rotation axis though in modified embodiments only one may be, as needed or desired.

Referring in particular to FIG. 8, in accordance with one embodiment, the connector 12 and the clamp 14 are permanently or quasi-permanently mechanically connected to one another, for example, with the connector pin 20 comprising a rivet and engaged with a clinched rivet head. In accordance with another embodiment, the connector 12 and the clamp 14 are removably or releasably mechanically connected to one another, for example, with the connector pin 20 comprising a bolt or screw engaged with a nut. In a modified embodiment, the nut may be used in combination with a clinched rivet head or the like to connect to the bolt or screw and hence provide a permanent or pseudo-permanent mechanical connection between the connector 12 and the clamp 14. In other embodiments, the connector 12 and the clamp 14 may be efficaciously connected buy other permanent or temporary attachment fasteners, as required or desired, giving due consideration to the goals of providing a secure attachment and/or of achieving one or more of the benefits and advantages as disclosed, taught or suggested herein.

In brief, the clamp (FIG. 8) generally comprises a clamp center plate 130, a clamp collar plate 132 and a set screw 134. The connector pin 20 mechanically connects the clamp 14 and connector 12. The clamp 14 is rotatable, swivelable or pivotable about the axis 22. The clamp 14 can securely and deformingly grip a brace wall of a brace.

Still referring to FIG. 8, the center plate 130 has a first jaw 136 and the collar plate 132 has a second jaw 138 spaced for the first jaw 136 to form a gap therebetween for receiving a brace wall. The screw 134 is threadably mounted in an opening in the second jaw 138 and is movable towards the first jaw 136 to forcibly engage the brace wall. In some embodiments, the set screw 134 has a cone point for deformingly engaging the brace wall and the first jaw 136 has a recess 140 substantially aligned with the set screw 134 for receiving deformed material from said brace wall caused by the engagement of the set screw 134 with the brace wall to firmly clamp and grip the brace by the clamp 14.

Figure 9:
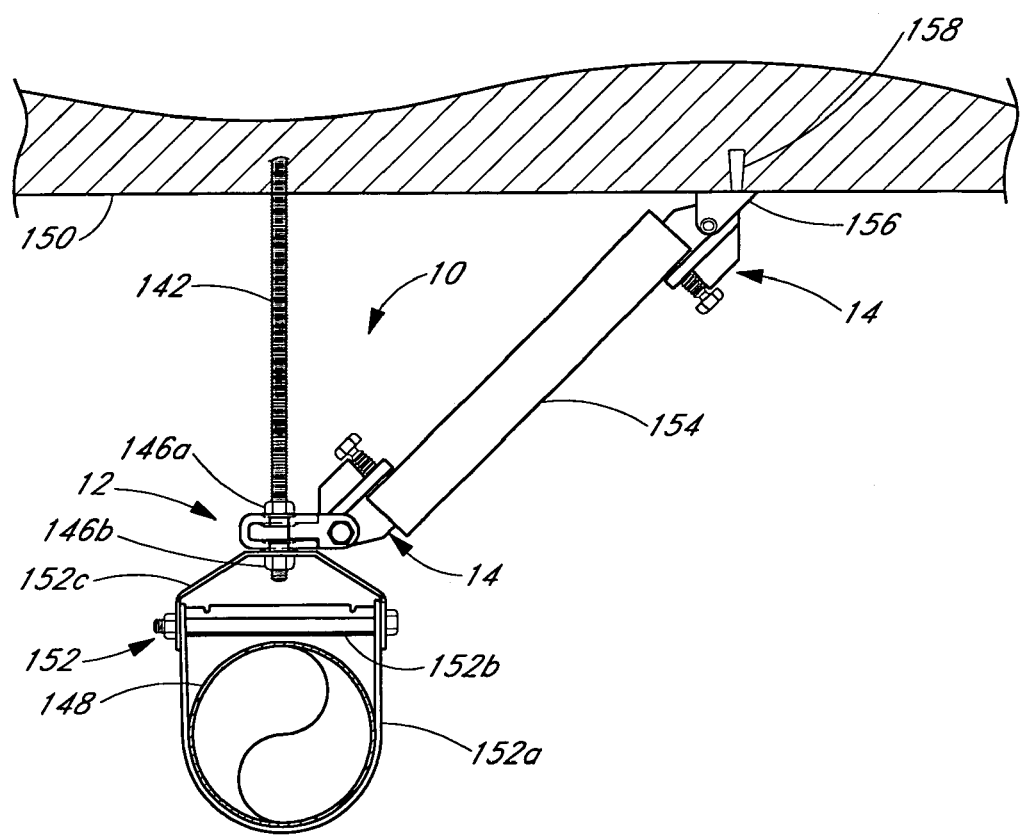
FIG. 9 is a simplified view (showing some hidden lines) of the assembly of FIG. 8 in use supporting a pipe suspended below a structure illustrating features and advantages in accordance with one embodiment of the invention.

FIG. 9 is a simplified view in accordance with one embodiment, showing the seismic connector-clamp assembly 10 in use supporting a load or pipe 148 suspended below a structure 150. A threaded support rod 142 extends from the structure 150 and is engaged with or connected to a clevis hanger 152, as known in the art, supporting the pipe 148. The hanger 152 generally comprises a lower portion 152a in which the pipe 148 is received and is connected by a cross-bolt spacer 152b to an upper portion 152c of the hanger 152 in which an end of the rod 142 is received. The connector 12 receives the rod 142 within the connector slots 58, 78 and the rod is proximate to or abuts against the slot closed ends 66, 86 (see, for example, FIG. 2). The rod 142 is secured to the hanger 152 by a pair of pre-existing nuts 146a, 146b on the rod 142. The upper nut 146a forms an interference fit with the coined recess 70 (see, for example, FIG. 2) to secure the connection between the connector 12 and the rod 142.

Referring to the illustrated embodiment of FIG. 9, the clamp 14 is connected to one end of a pipe brace 154. Of course, other types of braces may be efficaciously utilized, as needed or desired. The other end of the brace 154 is connected to the structure 150 by another clamp 14 attached to a yoke member 156. The yoke 156 is secured to the structure 150 by an anchor, bolt or screw 158 or the like. In other embodiments, the upper end of the brace 154 may be connected to the structure 150 using other suitable attachment devices with efficacy, as required or desired, giving due consideration to the goals of reliably supporting a load against adverse sway and seismic disturbances and/or of achieving one or more of the benefits and advantages as disclosed, taught or suggested herein.

Figure 10:
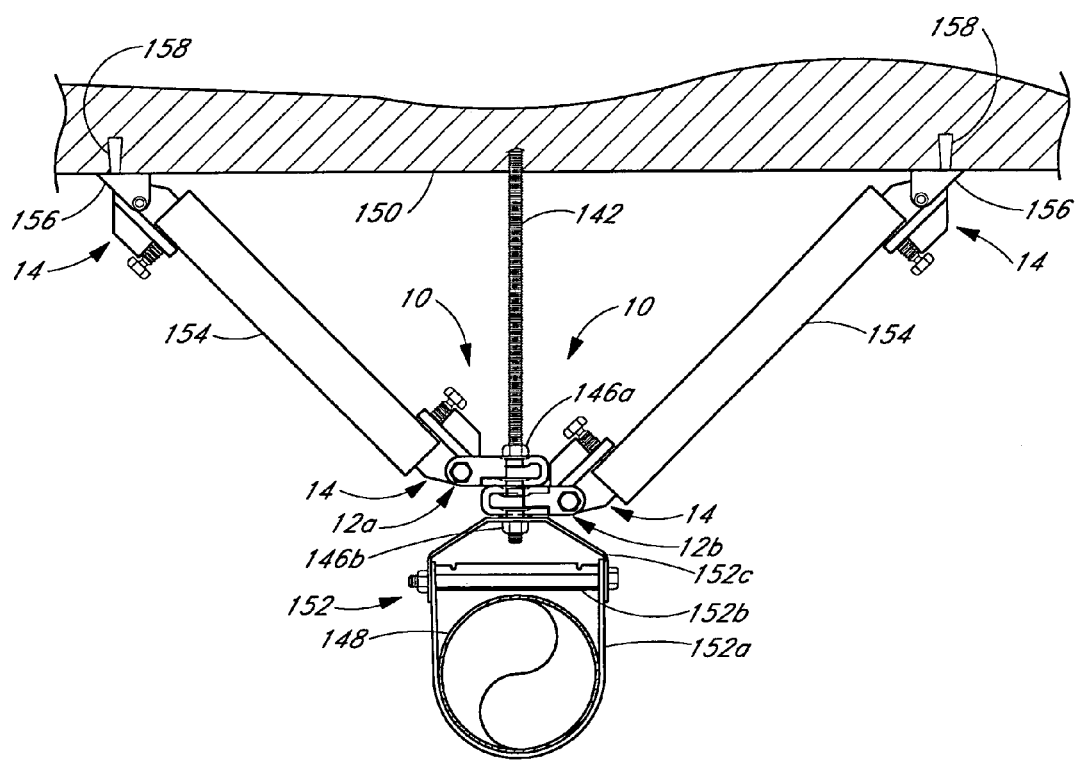
FIG. 10 is a simplified view (showing some hidden lines) of a stacked configuration operation of the assembly of FIG. 8 in use supporting a pipe suspended below a structure illustrating features and advantages in accordance with one embodiment of the invention.

FIG. 10 is a simplified view in accordance with one embodiment, showing a stacked configuration of retrofit connectors 12a, 12b in use supporting a load or pipe 148 suspended below a structure 150. Advantageously, the coined recess 70 of the lower connector 12b substantially mates with or receives the coined protrusion 94 of the upper connector 12a. This facilitates in aligning and orienting the connectors 12a, 12b and may also improve the overall load-carrying ability or strength of the retrofit connection.

In the illustrated embodiment FIG. 10, the slots 58, 78 of the lower connector 12b and slots 58, 78 of the upper connector 12a overlap substantially along their entire span and are aligned such that they open on the same side of the rod 142. In modified embodiments, the slots 58, 78 of the lower connector 12b and slots 58, 78 of the upper connector 12a may overlap at their respective closed ends and open on diametrically opposite sides of the rod 142 thereby securely capturing the rod 142 therebetween, as needed or desired.

Referring in particular to FIG. 10, a threaded support rod 142 extends from the structure 150 and is engaged with or connected to a clevis hanger 152, as discussed above, supporting the pipe 148. The rod 142 is secured to the hanger 152 by a pair of pre-existing nuts 146a, 146b on the rod 142. The upper nut 146a forms an interference fit with the coined recess 70 (see, for example, FIG. 2) of the upper connector 12a to secure the connection between the connectors 12a, 12b and the rod 142.

Referring to the illustrated embodiment of FIG. 10, the clamps 14 are connected to one end of a respective one of a pipe brace 154. Of course, other types of braces may be efficaciously utilized, as needed or desired. The other ends of the braces 154 are connected to the structure 150 by a corresponding one of other clamps 14 attached to a respective one of a yoke member 156. The yokes 156 are secured to the structure 150 by a corresponding anchor, bolt or screw 158 or the like. In other embodiments, the upper ends of the braces 154 may be connected to the structure 150 using other suitable attachment devices with efficacy, as required or desired, giving due consideration to the goals of reliably supporting a load against adverse sway and seismic disturbances and/or of achieving one or more of the benefits and advantages as disclosed, taught or suggested herein.

Figure 11:
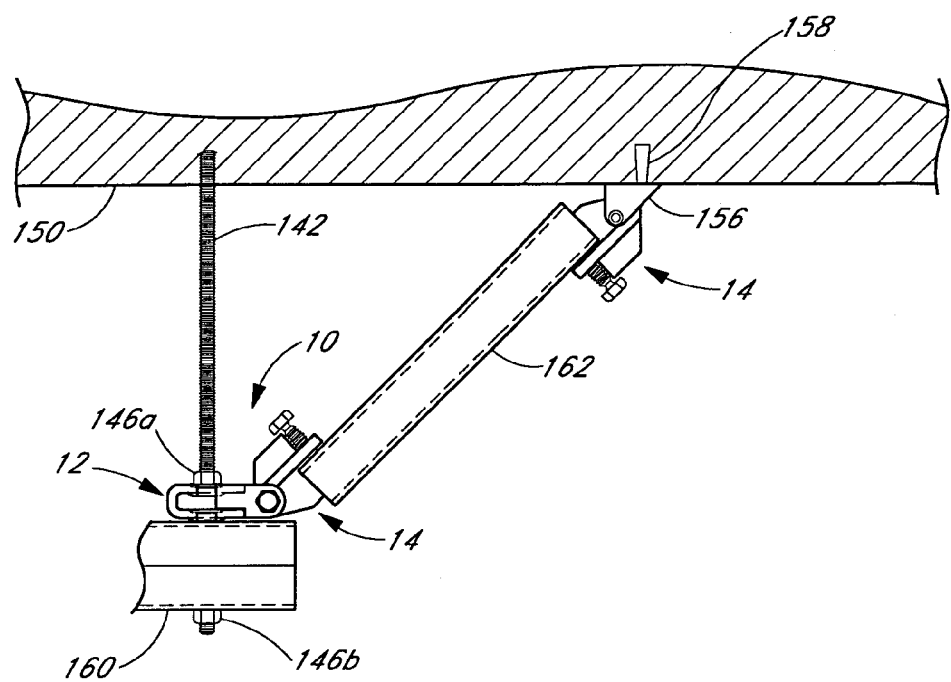
FIG. 11 is a simplified view (showing some hidden lines) of the assembly of FIG. 8 in use supporting a trapeze hanger suspended below a structure illustrating features and advantages in accordance with one embodiment of the invention.

FIG. 11 is a simplified view in accordance with another embodiment, showing the installation of the seismic connector-clamp assembly 10 below a structure 150. A threaded support rod 142 extends from the structure and is engaged with or connected to a trapeze type hanger 160, as known in the art, for supporting a load such as one or more pipes (not shown) seated on and/or secured to the hanger 160. The connector 12 receives the rod 142 within the connector slots 58, 78 and the rod is proximate to or abuts against the slot closed ends 66, 86 (see, for example, FIG. 2). The rod 142 is secured to the hanger 160 by a pair of pre-existing nuts 146a, 146b on the rod 142. The upper nut 146a forms an interference fit with the coined recess 70 (see, for example, FIG. 2) to secure the connection between the connector 12 and the rod 142.

Referring to the illustrated embodiment of FIG. 11, the clamp 14 is connected to one end of a channel brace 162. Of course, other types of braces may be efficaciously utilized, as needed or desired. The other end of the brace 162 is connected to the structure 150 by another clamp 14 attached to a yoke member 156. The yoke 156 is secured to the structure 150 by an anchor, bolt or screw 158 or the like. In other embodiments, the upper end of the brace 162 may be connected to the structure 150 using other suitable attachment devices with efficacy, as required or desired, giving due consideration to the goals of reliably supporting a load against adverse sway and seismic disturbances and/or of achieving one or more of the benefits and advantages as disclosed, taught or suggested herein.

Figure 12:
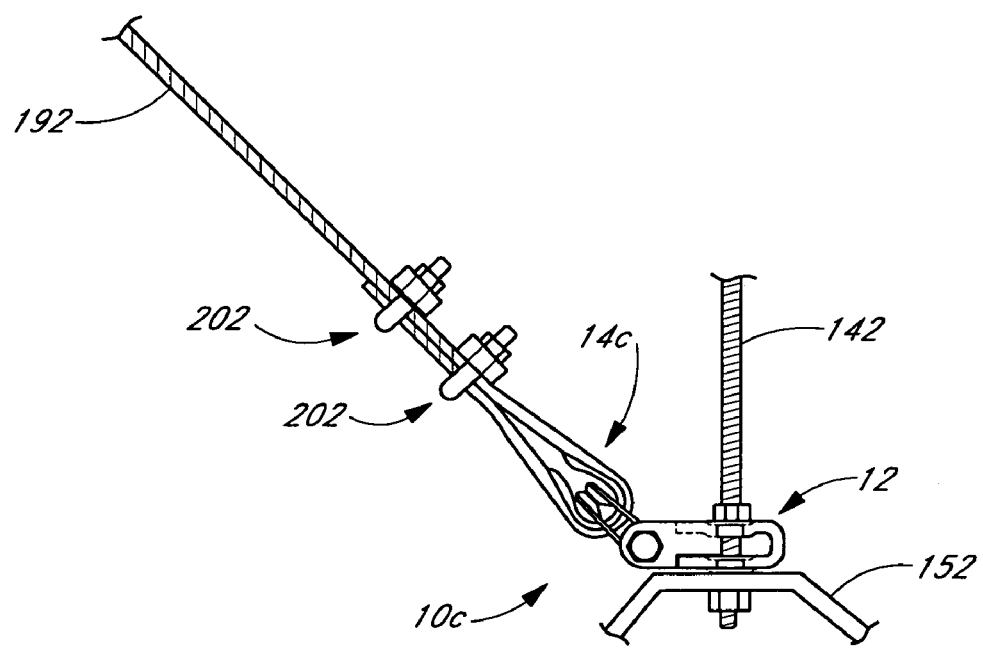
FIG. 12 is a simplified view (showing some hidden lines) of another retrofit assembly in use connected to a support rod for supporting a load below a structure illustrating features and advantages in accordance with one embodiment of the invention.

FIG. 12 shows a seismic brace assembly 10c, in accordance with one embodiment, comprising the retrofit connector 12 and a cable brace attachment or fitting 14c. The assembly 10c by utilizing the connector 12 provides a retrofit connection to a support rod or bolt 142 of a pre-existing installation. As shown in FIG. 12, the fitting 14c is used to connect the assembly 10c to a cable brace 192.

In the illustrated embodiment of FIG. 12, the connector 12 is attached to the support rod 142 which in turn is connected to a hanger 152 or the like to support a load below a structure. The cable brace attachment 14c is secured to the cable 192. One end of the cable 192 loops through the attachment 14c and is secured in position by cable fasteners or clamps 202, as are known in the art.

Figure 13:
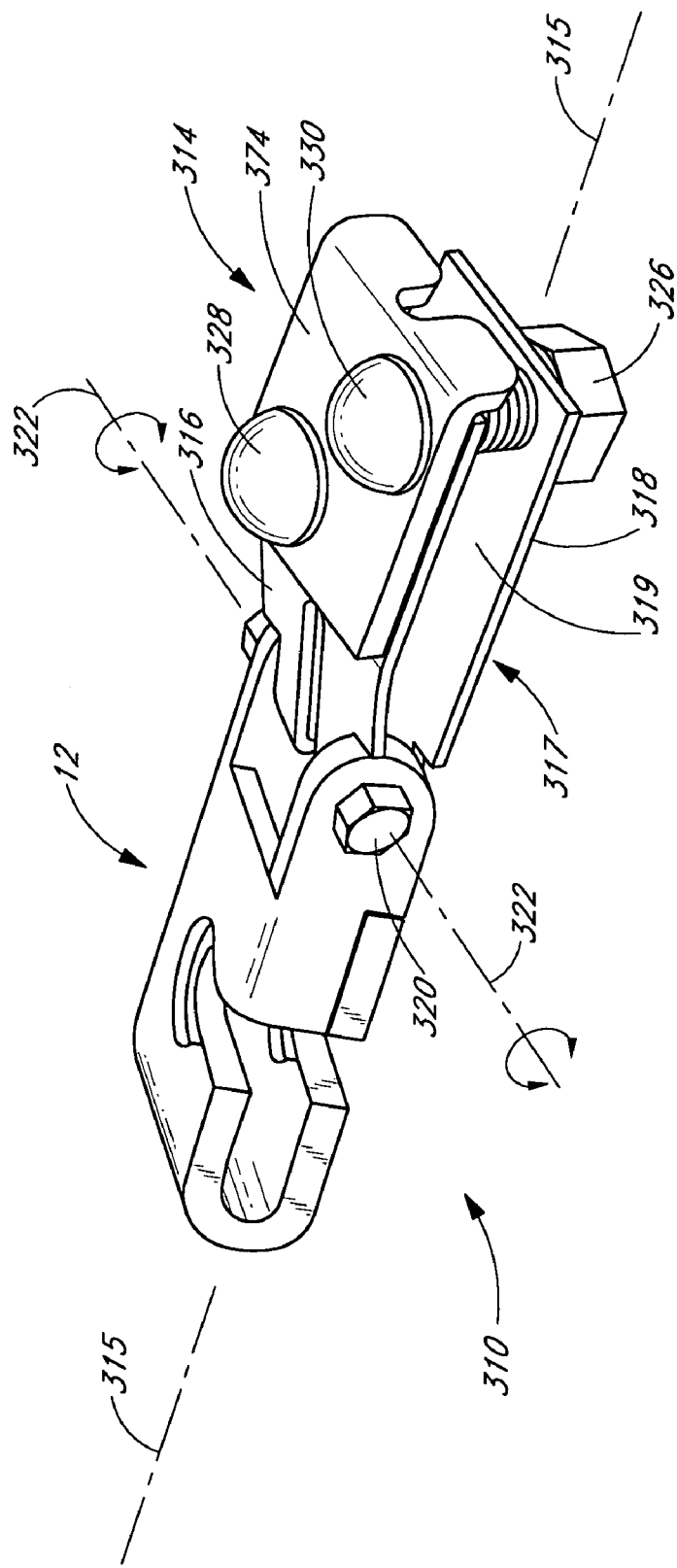
FIG. 13 is a simplified perspective view of an assembly generally comprising the retrofit connector of FIG. 1 and a sway brace cable clamp illustrating features and advantages in accordance with one embodiment of the invention.

In one embodiment, and referring in particular to FIG. 13, a cable sway brace assembly or system 310 generally comprises the connector 12 mechanically connected to a cable sway brace clamp 314. Certain embodiments of the cable clamp 314 are described in U.S. patent application Ser. No. 10/260,473, filed Sep. 26, 2002, U.S. Publication No. 2004/0031896 A1, published Feb. 19, 2004, entitled SWAY BRACE CLAMP AND CONNECTOR ASSEMBLY, and U.S. patent application Ser. No. 10/255,950, filed Sep. 26, 2002, U.S. Publication No. 2004/0031887 A1, published Feb. 19, 2004, entitled BRACE CLAMP AND CONNECTOR ASSEMBLY, the entirety of each one of which is hereby incorporated by reference herein.

As discussed above and also below herein, the seismic earthquake brace connector 12 is attachable to a rod or bolt of an already installed system supporting a suspended load, such as a pipe and the like, without disassembly of the existing system. The cable clamp 314 is securely attachable to a brace, such as a bracing cable, to protect the suspended load against adverse sway and seismic disturbances. The assembly 310 and/or the clamp 314 and/or the connector 12 have a generally longitudinal axis 315.

Referring in particular to FIG. 13, the clamp 314 is pivotable or swivelable about a fastener or pin 320 the longitudinal axis of which generally defines a rotation, pivot or swivel axis 322. The pin 320 mechanically connects or couples the clamp 314 and the connector 12. In the illustrated embodiment, the clamp longitudinal axis 315 is oriented substantially perpendicular to the rotation axis 322.

In the illustrated embodiment of FIG. 13, advantageously, the hinged connection or coupling between the connector 12 and clamp 314 allows the orientation and/or angulation between the connector 12 and clamp 314 to be adjusted or selected, as needed or desired. Preferably, both the connector 12 and clamp 314 are rotatable about the rotation axis 322 though in modified embodiments only one may be, as needed or desired.

Referring in particular to FIG. 13, in accordance with one embodiment, the connector 12 and the clamp 314 are permanently or quasi-permanently mechanically connected to one another, for example, with the connector pin 320 comprising a rivet and engaged with a clinched rivet head. In accordance with another embodiment, the connector 12 and the clamp 314 are removably or releasably mechanically connected to one another, for example, with the connector pin 320 comprising a bolt or screw engaged with a nut. In a modified embodiment, the nut may be used in combination with a clinched rivet head or the like to connect to the bolt or screw and hence provide a permanent or pseudo-permanent mechanical connection between the connector 12 and the clamp 314. In other embodiments, the connector 12 and the clamp 314 may be efficaciously connected buy other permanent or temporary attachment fasteners, as required or desired, giving due consideration to the goals of providing a secure attachment and/or of achieving one or more of the benefits and advantages as disclosed, taught or suggested herein.

In brief, the cable clamp 314 (FIG. 13) generally comprises a main body portion 317 having a pair of flexible arms or jaws 316, 318 spaced from one another and movable towards one another by tightening of nuts 326 attached to respective bolts 328, 330 which traverse the arms 316, 318, thereby securing a bracing cable therebetween. In the illustrated embodiment, in the open position, the jaws 316 and 318 are generally parallel and separated by a gap 319 which is variable in size and receives the bracing cable.

Still referring to FIG. 13, preferably, the clamp 314 further comprises a reinforcement plate 374 above the upper arm 316 and in mechanical communication with it or mechanically connected to it. Advantageously, the reinforcement plate provides rigidity, increased strength and structural integrity to the upper arm 316 and the cable clamp 314. In a modified embodiment, the main body portion 317 (and/or the upper arm 316) and the reinforcement plate 374 comprise an integral unit.

Figure 14:
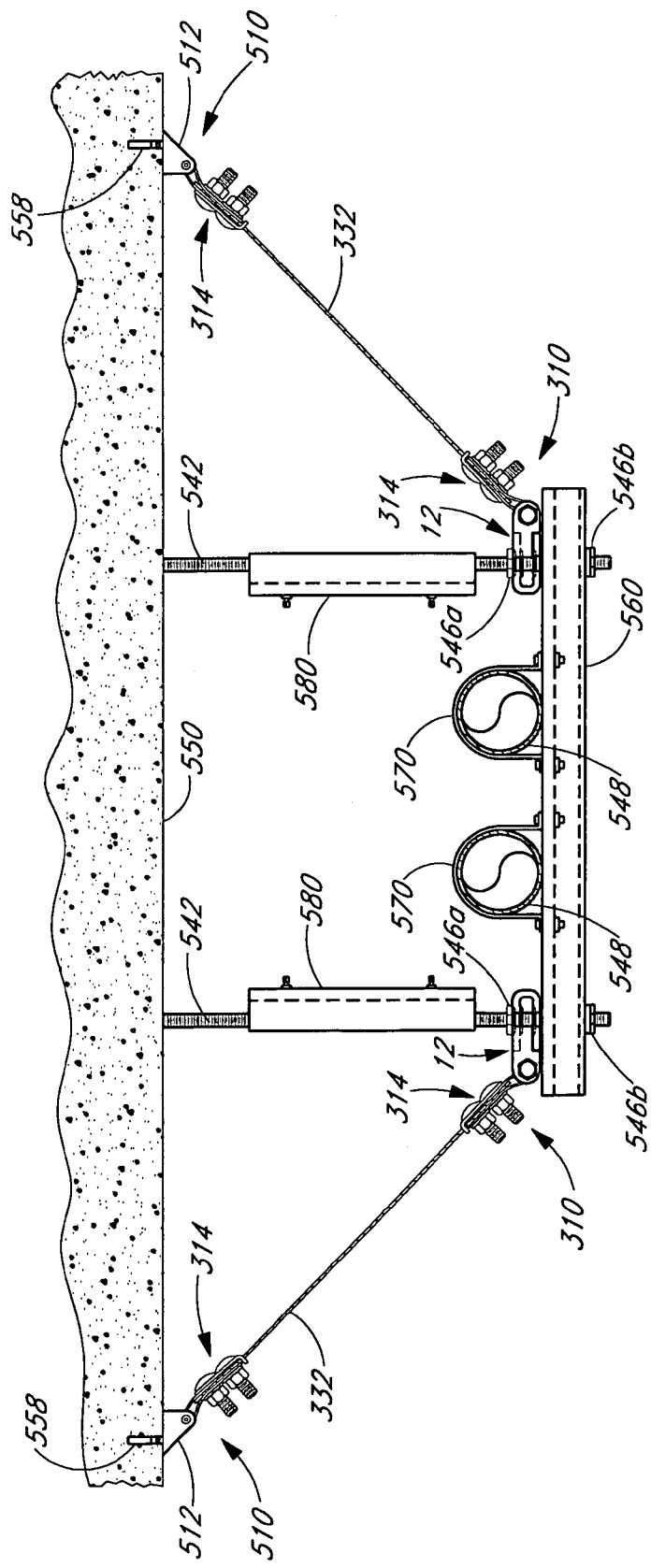
FIG. 14 is a simplified view (showing some hidden lines) of the assembly of FIG. 13 in use supporting a plurality of pipes suspended below a structure illustrating features and advantages in accordance with one embodiment of the invention.

FIG. 14 is a simplified view in accordance with one embodiment, showing the installation of a pair of retrofit cable clamp-connector assemblies 310 and a pair of cable clamp-connector assemblies 510 for supporting a load such as one or more pipes 548 below a structure 550. A pair of threaded support rods 542 extend from the structure 550 and are engaged with or connected to a trapeze type hanger 560, as known in the art. The hanger 560 supports the pipes 548 which are seated on and secured to the hanger 560 by respective holders 570. Optionally, rod stiffener assemblies 580 are utilized to provide enhanced strength and rigidity to the installation.

Referring to the illustrated embodiment of FIG. 14, the retrofit connectors 12 of respective clamp-connector assemblies 310 receive respective rods 542 within the respective pairs of connector slots 58, 78 and the rods are proximate to or abut against the respective pairs of slot closed ends 66, 86 (see, for example, FIG. 2). The rods 542 are secured to the hanger 560 by respective pairs of pre-existing nuts 546a, 546b on the rods 542. The upper nuts 546a form an interference fit with the respective coined recesses 70 (see, for example, FIG. 2) to secure the connection between the connectors 12 and the respective rods 542.

Still referring to the illustrated embodiment of FIG. 14, the cable clamps 314 of respective clamp-connector assemblies 310 are connected to respective ends of respective bracing cables 332. The other respective ends of respective cables 332 are connected to respective cable clamps 314 of respective assemblies 510. Yokes 512 of respective seismic assemblies 510 are secured to the structure 550 by respective anchors, bolts or screws 558 or the like.

Figure 15:
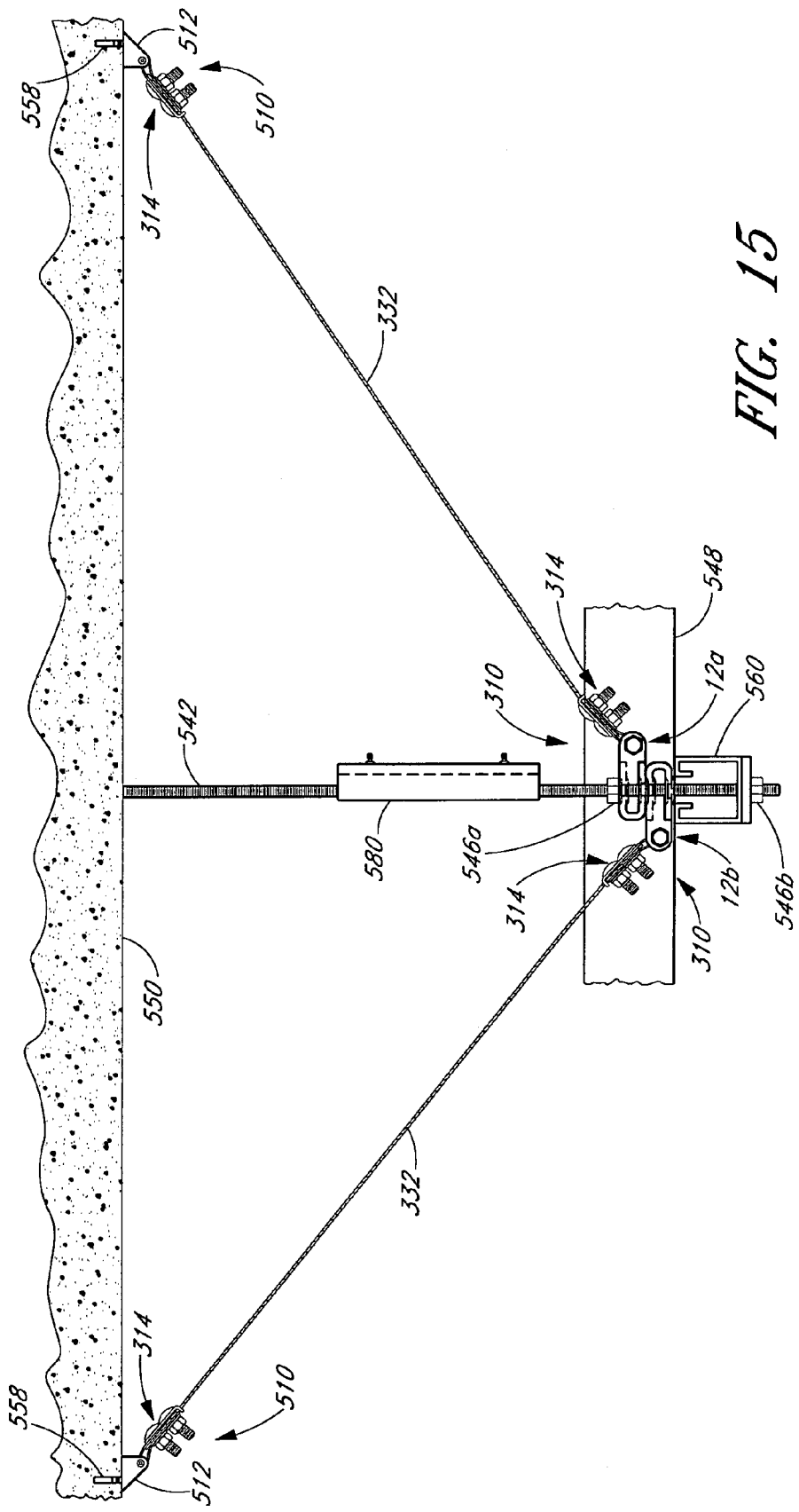
FIG. 15 is a simplified view (showing some hidden lines) of a stacked configuration operation of the assembly of FIG. 13 in use supporting a plurality of pipes suspended below a structure illustrating features and advantages in accordance with one embodiment of the invention.

FIG. 15 is a simplified view in accordance with one embodiment, showing the installation of a pair of retrofit cable clamp-connector assemblies 310 and a pair of cable clamp-connector assemblies 510 for supporting a load such as one or more pipes 548 below a structure 550. A threaded support rod 542 extends from the structure 550 and is engaged with or connected to a trapeze type hanger 560, as known in the art. The hanger 560 supports the pipe 548 which is seated on and/or secured to the hanger 560. Optionally, a rod stiffener assembly 580 is utilized to provide enhanced strength and rigidity to the installation.

Referring to the illustrated embodiment of FIG. 15, the retrofit connectors 12a, 12b are arranged in a stacked configuration. Advantageously, the coined recess 70 of the lower connector 12b substantially mates with or receives the coined protrusion 94 of the upper connector 12a. This facilitates in aligning and orienting the connectors 12a, 12b and may also improve the overall load-carrying ability or strength of the retrofit connection.

In the illustrated embodiment FIG. 15, the slots 58, 78 of the lower connector 12b and slots 58, 78 of the upper connector 12a overlap substantially along their entire span and are aligned such that they open on the same side of the rod 542. In modified embodiments, the slots 58, 78 of the lower connector 12b and slots 58, 78 of the upper connector 12a may overlap at their respective closed ends and open on diametrically opposite sides of the rod 542 thereby securely capturing the rod 542 therebetween, as needed or desired.

Still referring in particular to FIG. 15, the rod 542 is secured to the hanger 560 by a pair of pre-existing nuts 546a, 546b on the rod 542. The upper nut 546a forms an interference fit with the coined recess 70 (see, for example, FIG. 2) of the upper connector 12a to secure the connection between the connectors 12a, 12b and the rod 542.

Still referring to the illustrated embodiment of FIG. 15, the cable clamps 314 of respective clamp-connector assemblies 310 are connected to respective ends of respective bracing cables 332. The other respective ends of respective cables 332 are connected to respective cable clamps 314 of respective assemblies 510. Yokes 512 of respective seismic assemblies 510 are secured to the structure 550 by respective anchors, bolts or screws 558 or the like.

Figure 16:
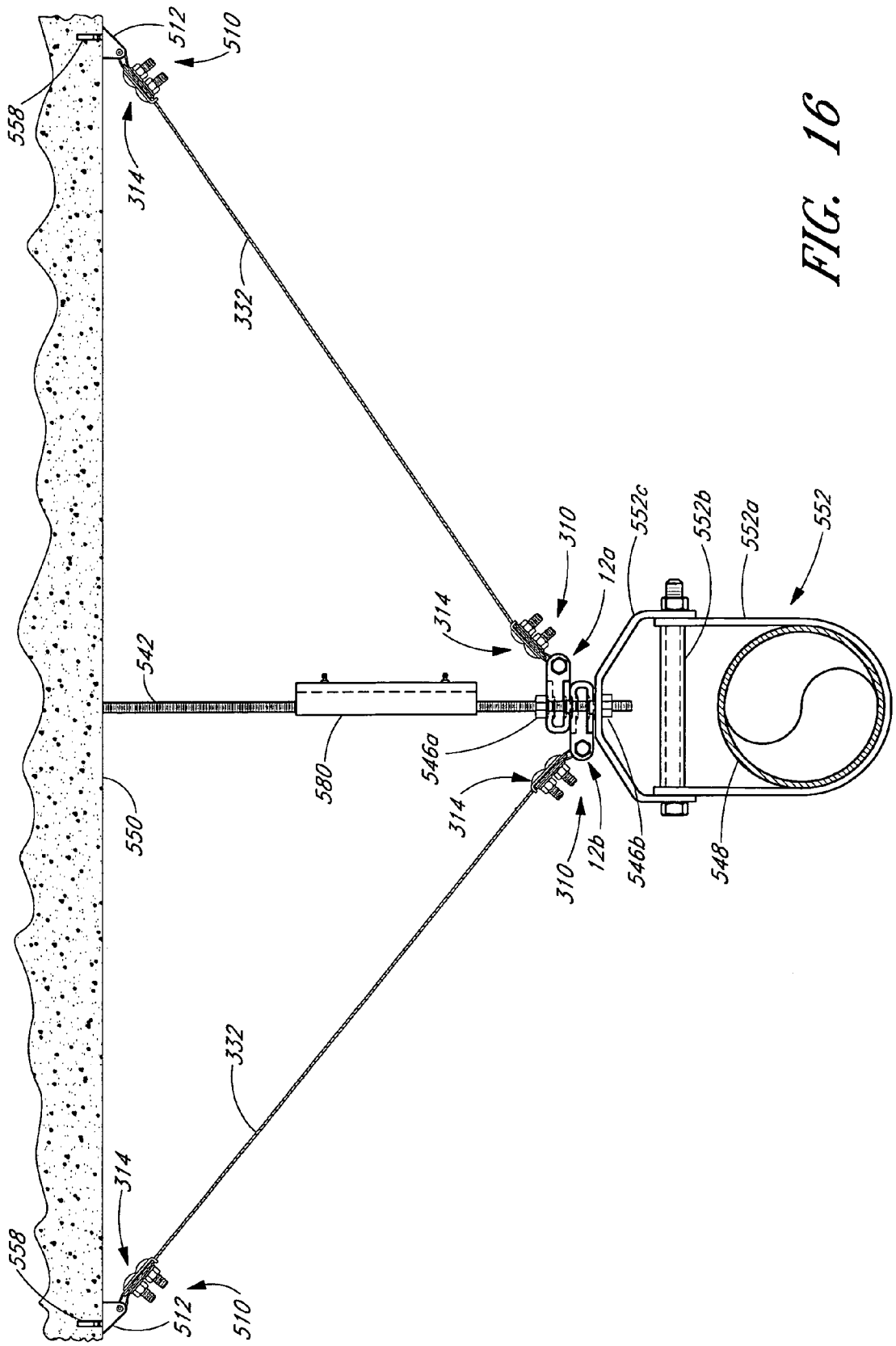
FIG. 16 is a simplified view (showing some hidden lines) of a stacked configuration operation of the assembly of FIG. 13 in use supporting a pipe suspended below a structure illustrating features and advantages in accordance with one embodiment of the invention.

FIG. 16 is a simplified view in accordance with one embodiment, showing the installation of a pair of retrofit cable clamp-connector assemblies 310 and a pair of cable clamp-connector assemblies 510 for supporting a load such as a pipe 548 below a structure 550. A threaded support rod 542 extends from the structure 550 and is engaged with or connected to a clevis hanger 552, as known in the art, which supports the pipe 548. The hanger 552 generally comprises a lower portion 552a in which the pipe 548 is received and is connected by a cross-bolt spacer 552b to an upper portion 552c of the hanger 552 in which an end of the rod 542 is received. Optionally, a rod stiffener assembly 580 is utilized to provide enhanced strength and rigidity to the installation.

Referring to the illustrated embodiment of FIG. 16, the retrofit connectors 12a, 12b are arranged in a stacked configuration. Advantageously, the coined recess 70 of the lower connector 12b substantially mates with or receives the coined protrusion 94 of the upper connector 12a. This facilitates in aligning and orienting the connectors 12a, 12b and may also improve the overall load-carrying ability or strength of the retrofit connection.

In the illustrated embodiment FIG. 16, the slots 58, 78 of the lower connector 12b and slots 58, 78 of the upper connector 12a overlap substantially along their entire span and are aligned such that they open on the same side of the rod 542. In modified embodiments, the slots 58, 78 of the lower connector 12b and slots 58, 78 of the upper connector 12a may overlap at their respective closed ends and open on diametrically opposite sides of the rod 542 thereby securely capturing the rod 542 therebetween, as needed or desired.

Still referring in particular to FIG. 16, the rod 542 is secured to the hanger 560 by a pair of pre-existing nuts 546a, 546b on the rod 542. The upper nut 546a forms an interference fit with the coined recess 70 (see, for example, FIG. 2) of the upper connector 12a to secure the connection between the connectors 12a, 12b and the rod 542.

Still referring to the illustrated embodiment of FIG. 16, the cable clamps 314 of respective clamp-connector assemblies 310 are connected to respective ends of respective cables bracing 332. The other respective ends of respective cables 332 are connected to respective cable clamps 314 of respective assemblies 510. Yokes 512 of respective seismic assemblies 510 are secured to the structure 550 by respective anchors, bolts or screws 558 or the like.

Though the embodiments of FIGS. 9-11 and 14-16 show the load suspended below a generally horizontal surface with yokes 156 and 512 attached thereto, those of ordinary skill in the art will appreciate that the yokes 156 and 512 may be efficaciously attached to other surfaces, as needed or desired. For example, one or more of the yokes 156 and 512 may be attached to a generally vertical beam or wall or to an inclined surface.

The retrofit connector 12 and other retrofit connector embodiments may be utilized in conjunction with a new, that is, not pre-existing, installation with efficacy, as needed or desired. This facilitates, for example, in adjustment, removal, and/or replacement of the retrofit connector and/or of the installation.

Also, as the skilled artisan will appreciate, that though the embodiments of FIGS. 9-12 and 14-16 refer to supporting one or more pipes, other loads may be efficaciously supported in conjunction with any of the embodiments, as needed or desired. These include, without limitation, ducts, sprinkler systems, fans, air-conditioners, heaters, electrical cables, communication lines, and the like, among others.

Various types of braces may be used in conjunction with the retrofit connector 12 and other retrofit connector embodiments. These include, but are not limited to, bracing pipes, cables, channels, plates, angled plates or beams, I-beams and the like, among others, as needed or desired.

The installation of the retrofit connector 12 and other retrofit connector embodiments may utilize one or more braces. These include both longitudinal and lateral braces as well as opposing braces that may be installed on a single hanger rod (e.g., rod 142), for example, using stacked retrofit connectors 12.

Another Retrofit Connector

FIGS. 17-22 show different views of another embodiment of a retrofit attachment connector or yoke 612. The retrofit yoke or connector 612 has a generally longitudinal axis 615 and is preferably rotatable, pivotable or swivelable about a rotation, pivot or swivel axis 622 with the axes 615 and 622 being generally perpendicular to one another. As discussed above in connection with embodiments of the connector 12, the seismic earthquake brace connector 612 is attachable to a rod or bolt of an already installed system supporting a suspended load, such as a pipe and the like, without disassembly of the existing system.

The retrofit connector 612 (FIGS. 17-22) is attachable to a wide variety of suitable clamps, fittings, attachments, yokes and the like, including those disclosed, taught or suggested herein and above in connection with embodiments of the connector 12. These clamps or devices are securely attachable to a brace, such as a bracing pipe, bracing cable and the like, to protect the suspended load against adverse sway and seismic disturbances. The retrofit connector 612 can be used in conjunction with any of the clamp and installation embodiments (for example those of FIGS. 8-16) as disclosed, taught or suggested herein and above.

In the illustrated embodiment of FIGS. 17-22, the retrofit connector 612 is generally in the form of a curved and/or bent plate with a plurality of angled and spaced walls or surfaces. The connector 612 generally comprises a proximal or base portion or section 624 which connects to a clamp or the like and a distal or main body portion or section 628 which connects to a threaded rod or the like of an installation.

In the illustrated embodiment of FIGS. 17-22, the proximal portion 624 generally comprises a pair of substantially horizontal upper walls 632*a*, 632*b*, a pair of substantially horizontal lower walls 634*a*, 634*b* and a pair of intermediate curved or rounded proximal-most ends or walls 636*a*, 636*b* to form a through passage or opening 640 which receives a connector pin or the like to attach the connector 612 to a clamp or other device (e.g., fitting 14 or clamp 314). The walls 632*a*, 634*a*, 636*a* are mechanically connected to one another to form a generally U-shaped first portion and the walls 632*b*, 634*b*, 636*b* are mechanically connected to one another to form a generally U-shaped second portion spaced from the first U-shaped portion by a generally U-shaped slot 638.

In one embodiment, the proximal portion 624 is sized and configured such that a portion of clamp or other device fits over it and allows connection by using a connector pin or the like that passes through the passage 640. In another embodiment, the slot 638 is sized and configured such that a portion of clamp or other device fits over it and allows connection by using a connector pin or the like that passes through the passage 640. The rotation axis 622 passes substantially through the center of the passage 640.

In the illustrated embodiment of FIGS. 17-22, the proximal portion 624 and the distal portion 628 are integrally connected to form an integral unit though in modified embodiments they may be comprise individual or independent components that are attached to one another. The proximal portion 624 and the distal portion 628 are mechanically connected or in mechanical communication with one another.

In the illustrated embodiment of FIGS. 17-22, the distal or main body portion 628 generally comprises a pair of generally horizontal spaced walls or jaws 648, 650 and generally vertical side walls 654*a*, 654*b*, 656. The upper wall 648 and lower wall 650 extend substantially parallel to one another. The side walls 654*a*, 654*b* are spaced from one another and spaced from the side wall 656 by the horizontal wall 648. The side walls 654*a*, 654*b* are generally aligned with one another and substantially parallel to the side wall 656. The side walls 654*a*, 654*b*, 656 extend generally parallel to the longitudinal axis 615 and generally perpendicular to the rotation axis 622.

In the illustrated embodiment of FIGS. 17-22, the generally central slot 638 extends into the upper and lower walls 648, 650 and has a respective closed end in respective distal section walls 648, 650. The proximal upper walls 632*a*, 632*b* are mechanically connected to or in mechanical communication with the distal upper wall 648 and spaced from respective distal side walls 654*a*, 656 by respective gaps 657*a*, 657*b*. The proximal lower walls 634*a*, 634*b* are mechanically connected to or in mechanical communication with the distal lower wall 650. Proximal-most ends of the side walls 654*a*, 656 in combination with respective proximal ends 636*a*, 636*b* form respective openings of the passage 640 and allow capture of a connector pin or the like.

Figure 17:
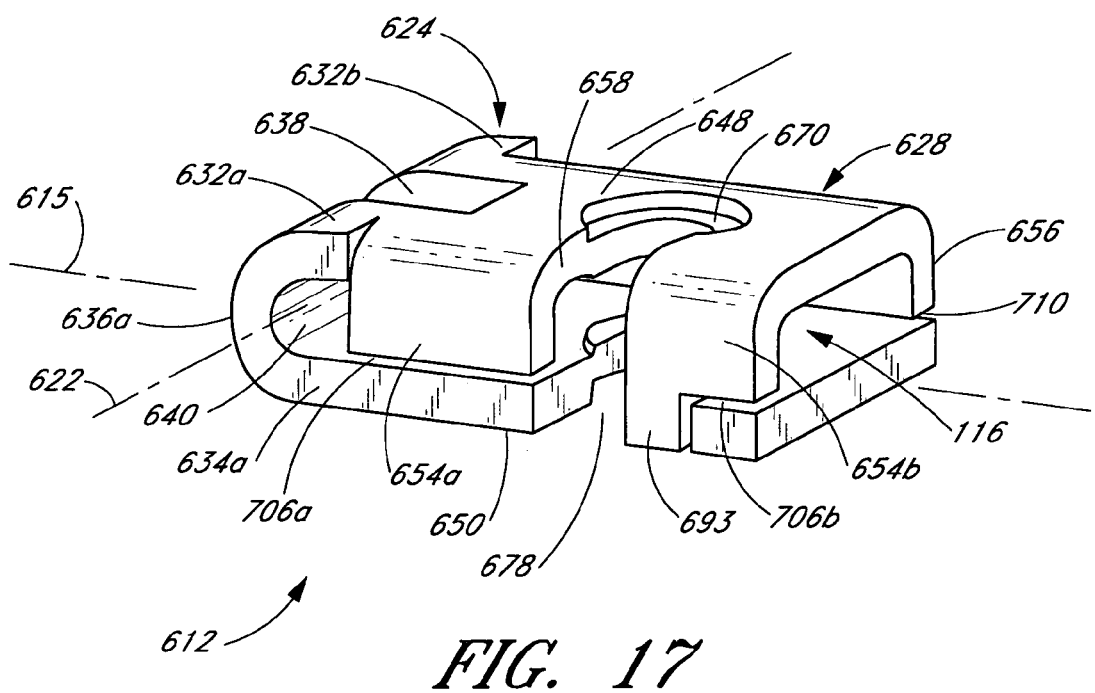
FIG. 17 is a simplified perspective view of another retrofit connector illustrating features and advantages in accordance with one embodiment of the invention.

In the illustrated embodiment of FIGS. 17-22, and as best seen in FIGS. 17 and 18, the upper wall 648 has a slot 658 which extends from a side edge 660 towards an opposite side edge 662. The slot 658 is generally U-shaped and has a rectangular portion and a curved or rounded portion. The slot 658 includes an open end 664 and a generally rounded closed end 666 in the form of a half- or semi-circle. The slot 658 is sized and configured to receive (for example, by substantially laterally slidingly) a threaded rod or bolt (e.g., rod 142) of an installation.

In the illustrated embodiment of FIGS. 17-22, the slot 658 may also be defined as extending between the side walls 654*a*, 654*b* and opening proximate to the lower wall 650. In this case, the slot 658 is generally L-shaped. In another case, the L-shaped slot 658 may be defined as two slots with one each comprising a respective leg of the L-shape.

In the illustrated embodiment of FIGS. 17-22, the upper wall 648 is oriented generally parallel to the proximal portion walls 632, 634. A line passing through the center of the imaginary full circle formed by the half- or semi-circle of the slot closed end 666 is referred to herein as the longitudinal axis 668 of the slot 658 or of its rod- or bolt-receiving cavity or portion. In the illustrated embodiment, the slot longitudinal axis 668 is generally perpendicular to the connector longitudinal axis 615 and the rotation axis 622.

In the illustrated embodiment of FIGS. 17-2, the upper wall 648 has a recess, cavity or pocket 670 at its upper surface 672 and a corresponding protrusion 674 at its lower surface 676. In one embodiment, a "coining" operation is utilized to form the recess 670 and the resulting protrusion 674. The recess 670 is sized and configured to provide clearance space for and to form an interference fit with a nut (e.g., nut 146*a*) used to secure the connector 612 to a threaded rod or bolt (e.g., rod 142) of an installation. The nut matingly interlocks with the recess 670. In the illustrated embodiment, the recess 670 and protrusion 674 have tapered or angled side walls.

In the illustrated embodiment of FIGS. 17-22, and as best seen in FIGS. 17 and 18, the recess 670 is generally semi-circular in shape and circumscribes the slot closed end 666 and extends towards the slot open end 664. The diameter of the imaginary full circle formed by the semi-circular recess 670 is larger than the diameter of the imaginary full circle formed by the semi-circular slot closed end 666. A line passing through the center of the imaginary full circle formed by the semi-circular recess 670 is substantially the same as or coincident with the slot longitudinal axis 668.

In the illustrated embodiment of FIGS. 17-22, the protrusion 674 is generally semi-circular in shape and circumscribes the slot closed end 666 and extends towards the slot open end 664. In some embodiments, the diameter of the imaginary full circle formed by the semi-circular protrusion 674 is slightly larger than the diameter of the imaginary full circle formed by the semi-circular recess 670. A line passing through the center of the imaginary full circle formed by the semi-circular protrusion 674 is substantially the same as or coincident with the slot or recess longitudinal axis 668.

In the illustrated embodiment of FIGS. 17-2, the lower wall 650 has a slot 678 which extends from a side edge 680 towards an opposite side edge 682. The upper and lower slots 658 and 678 are substantially aligned with one another and, in one embodiment, are substantially identical in shape. The slot 678 is generally U-shaped and has a rectangular portion and a curved or rounded portion. The slot 678 includes an open end 684 and a generally rounded closed end 686 in the form of a half- or semi-circle. The slot 678 (and slot 658) is sized and configured to receive (for example, by substantially laterally slidingly) a threaded rod or bolt (e.g., rod 142) of an installation.

In the illustrated embodiment of FIGS. 17-22, the slots 658, 678 open with respective open ends 664, 684 at respective side edges 660, 680. In another embodiment, the slots 658, 678 can open with respective open ends 664, 684 at opposite respective side edges 662, 682

In the illustrated embodiment of FIGS. 17-22, the lower wall 650 is oriented generally perpendicular to the proximal portion walls 632, 634. A line passing through the center of the imaginary full circle formed by the half- or semi-circle of the slot closed end 686 is substantially the same as or coincident with the longitudinal axis 668 (discussed above). In the illustrated embodiment, also as indicated above, the slot longitudinal axis 668 is generally perpendicular to the connector longitudinal axis 615 and the rotation axis 622.

In the illustrated embodiment of FIGS. 17-22, the lower wall 650 has a recess, cavity or pocket 690 at its upper surface 692 and a corresponding protrusion 694 at its lower surface 696. In one embodiment, a "coining" operation is utilized to form the recess 690 and the resulting protrusion 694. The protrusion 694 is sized and configured to allow for improved mating between two of the connectors 612, for example, in a stacked configuration with one on top of the other. In the illustrated embodiment, the recess 690 and protrusion 694 have tapered or angled side walls.

In a modified embodiment, the recess 690 may be sized and configured to provide clearance space for and to form an interference fit with a nut used to secure the connector 62 to a threaded rod or bolt of an installation. This may be accomplished by, for example, by configuring the side walls 654a, 654b so that they provide clearance space for allowing the nut to engage the recess 690.

In the illustrated embodiment of FIGS. 17-22, the recess 690 is generally semi-circular in shape and circumscribes the slot closed end 686 and extends towards the slot open end 684. The diameter of the imaginary full circle formed by the semi-circular recess 690 is larger than the diameter of the imaginary full circle formed by the semi-circular slot closed end 686. A line passing through the center of the imaginary full circle formed by the semi-circular recess 690 is substantially the same as or coincident with the slot longitudinal axis 668.

In the illustrated embodiment of FIGS. 17-22, the protrusion 694 is generally semi-circular in shape and circumscribes the slot closed end 686 and extends towards the slot open end 684. In some embodiments, the diameter of the imaginary full circle formed by the semi-circular protrusion 694 is slightly larger than the diameter of the imaginary full circle formed by the semi-circular recess 690. A line passing through the center of the imaginary full circle formed by the semi-circular protrusion 694 is substantially the same as or coincident with the slot or recess longitudinal axis 668.

In the illustrated embodiment of FIGS. 17-22, the distal lower wall 650 has a recessed clearance space 691 that receives a portion of the side wall 694b. The space 691 can be advantageous in aligning portions of the connector 612 during manufacture. The proximal walls 632, 634 and the distal walls 648, 650 are generally perpendicular to the side walls 654a, 654b, 656.

In the illustrated embodiment of FIGS. 17-22, the side walls 654a, 654b, 656 are mechanically connected to or in mechanical communication with the upper wall 648. The side wall 654a has a lower edge or surface which is proximate to and/or abuts the upper surface 692 of the lower wall 650 to form a gap 706a. The side wall 654b has a lower edge or surface which is proximate to and/or abuts the upper surface 692 of the lower wall 650 to form a gap 706b. The side wall 656 has a lower edge or surface which is proximate to and/or abuts the upper surface 692 of the lower wall 650 to form a gap 710. In some embodiments, the gaps 706a, 706b, 710 are minimized and can be a result of some degree of "spring" back within the material of the connector 612, for instance, due to bending operations.

In the illustrated embodiment of FIGS. 17-22, the side wall 654b has an extension portion 693 that is received in the recess, space or slot 691 of the lower wall 650. The extension portion 693 and lower wall 650 have gaps 700, 702 therebetween. In some embodiments, the gaps 700, 702 are minimized and can be a result of some degree of "spring" back within the material of the connector 612, for instance, due to bending operations.

In the illustrated embodiment of FIGS. 17-22, the side wall 654a generally terminates at an edge of the slot 658. The side wall 654b generally terminates at an opposite edge of the slot 658.

Advantageously, the arrangement of the various walls of the connector 612 (FIGS. 17-22) results in a gap or empty space 716. This reduces on the cost and amount of material used to fabricate the connector 612. Thus, the connector 612 is desirably lightweight and economical in cost.

In the illustrated embodiment of FIGS. 17-2, the slots 658, 678 are sized and configured to receive a threaded rod or bolt of an installation. A rod or bolt 142 is shown in phantom in FIG. 2. The slots 658, 678 have a predetermined, preselected or prescribed width for receiving a rod 142 of a particular diameter. The curvature (or the diameter of an imaginary full circle) of the semi-circular slot ends 666, 686 is also predetermined, preselected or prescribed to generally correspond to or be slightly larger than the diameter of the rod 142. The longitudinal axis 668 generally corresponds to the longitudinal axis of the rod 142 and which is also generally perpendicular to the connector axis 615 and the rotation axis 622.

The connector 62 (FIGS. 17-22) is fabricated from a suitably strong material to meet the standards set by the Underwriters Laboratories (U.L.), Factory Mutual Engineering (F.M.), and other such quality control groups. Preferably, the connector 612 is fabricated from steel. In one embodiment, the connector 612 comprises a mild steel. In another embodiment, the connector 612 comprises a carbon steel. In modified embodiments, the connector 612 may be fabricated from other suitably strong materials such as other metals, alloys, ceramics, plastics, laminates, reinforced composites, combinations thereof and the like, as needed or desired.

The connector 612 (FIGS. 17-22) may be provided with a suitable surface treatment or coating to enhance its durability and/or appearance. In one embodiment, the connector 612 has a surface coating to provide an electro-galvanized finish.

In one embodiment, the retrofit connector 612 has a length of about 7.62 cm (3 inches), a width of about 5.08 cm (2 inches), a height of about 2.5 cm (1 inch), a length $L_{181}$ (see FIG. 18) of about 1.9 cm (0.75 inches), a length $L_{191}$ (see FIG. 19) of about 0.95 cm (0.375 inches) and a nominal material thickness of about 6.4 mm (0.25 inches). In modified embodiments, other suitable dimensions may be efficaciously utilized, as needed or desired.

In one embodiment, the proximal portion 624 has a length of about 1.75 cm (0.688 inches), the proximal walls 632a, 634a, 636a, 632b, 634b, 636b have a width of about 1.98 cm (0.781 inches) and the inner radii of curvature of the proximal end walls 636a, 636b is about 5.6 mm (0.219 inches). In modified embodiments, other suitable dimensions may be efficaciously utilized, as needed or desired.

In one embodiment, the U-shaped slot 638 has a length of about 2.5 cm (1 inch) and a width of about 1.1 cm (0.437 inches). In modified embodiments, other suitable dimensions may be efficaciously utilized, as needed or desired.

In one embodiment, the radii of curvature where the side walls 654a, 654b, 656 meet the top wall 648 is about 0.95 cm (0.375 inches). In modified embodiments, other suitable dimensions may be efficaciously utilized, as needed or desired.

The width of the slots 658, 678 is customizable to engage different size hanger rods (e.g. rod 142) with a suitably small tolerance fit. In one embodiment, the slots 658, 678 can accommodate rod sizes or diameters in the range from about 0.95 cm (0.375 inches) to about 1.91 cm (0.75 inches). In modified embodiments, the slots 658, 678 may be dimensioned to accommodate larger or smaller rod sizes with efficacy, as needed or desired.

In one embodiment, the slots 658, 678 have a width of about 1.35 cm (0.531 inches). In another embodiment, the slots 658, 678 have a width in the range from about 1 cm (0.4 inches) to about 2 cm (0.8 inches), including all values and sub-ranges therebetween. In yet another embodiment, the slots 658, 678 have a width in the range from about 0.5 cm (0.2 inches) to about 2.5 cm (1 inch), including all values and sub-ranges therebetween. In modified embodiments, other suitable dimensions may be efficaciously utilized, as needed or desired.

The size of the top recess 670 is customizable to engage different sizes of a nut of an installation and desirably form an interference fit when the nut is tightened. In one embodiment, the recesses 670, 690 have a depth of about 2.36 mm (0.093 inches) and a diameter of about 2.22 cm (0.875 inches). In another embodiment, the recesses 670, 690 have a depth in the range from about 1 mm to about 5 mm and a diameter in the range from about 1 cm to about 5 cm, including all values and sub-ranges therebetween. In modified embodiments, other suitable dimensions may be efficaciously utilized, as needed or desired.

In one embodiment, the protrusions 674, 694 have a depth and diameter substantially the same as corresponding recesses 670, 690. In another embodiment, the protrusions 674, 694 have a diameter slightly larger than that of corresponding recesses 670, 690. In modified embodiments, other suitable dimensions may be efficaciously utilized, as needed or desired.

In one embodiment, the shear gaps 657a, 657b are minimized. In one embodiment, the gaps 657a, 657b have a size of about 1.6 mm ($1/16^{th}$ of an inch). In another embodiment, the gaps 657a, 657b have a size in the range from about 0.8 mm ($1/32^{nd}$ of an inch) to about 3.2 mm ($1/8^{th}$ of an inch), including all values and sub-ranges therebetween. In modified embodiments, other suitable dimensions may be efficaciously utilized, as needed or desired.

In one embodiment, the gaps 700, 702 have a size of about 1.6 mm ($1/16^{th}$ of an inch). In another embodiment, the gaps 700, 702 have a size in the range from about 0.8 mm ($1/32^{nd}$ of an inch) to about 3.2 mm ($1/8^{th}$ of an inch), including all values and sub-ranges therebetween. In modified embodiments, other suitable dimensions may be efficaciously utilized, as needed or desired.

In one embodiment, the gaps 706a, 706b and 710 have a size of about 1.6 mm ($1/16^{th}$ of an inch). In another embodiment, the gaps 706a, 706b and 710 have a size in the range from about 0.8 mm ($1/32^{nd}$ of an inch) to about 3.2 mm ($1/8^{th}$ of an inch), including all values and sub-ranges therebetween. In modified embodiments, other suitable dimensions may be efficaciously utilized, as needed or desired.

In some embodiments, the retrofit connector 612 advantageously provides a visual verification of proper installation torque. During installation, tightening of an existing nut on the hanger rod (e.g., rod 142) substantially completely closes the small gaps 706a, 706b and 710 to indicate proper torque installation. The lower wall 650 is displaced (and/or the upper wall 648) to close the gaps 706a, 706b and 710 on application of a predetermined torque or force.

In embodiments of a stacked configuration of connectors 612, closure of one or both sets of gaps 706a, 706b and 710 can be used as a visual indicator of proper installation torque. In a modified embodiment, closure of a small gap between stacked connectors 612 may be used as a visual indicator of proper installation torque.

The connector 612 (FIGS. 17-22) of embodiments of the invention can be manufactured or fabricated by a wide variety of methods and/or technologies. These include, without limitation, stamping/punching, casting, molding, forging, machining, combinations thereof, among others.

Figure 23:
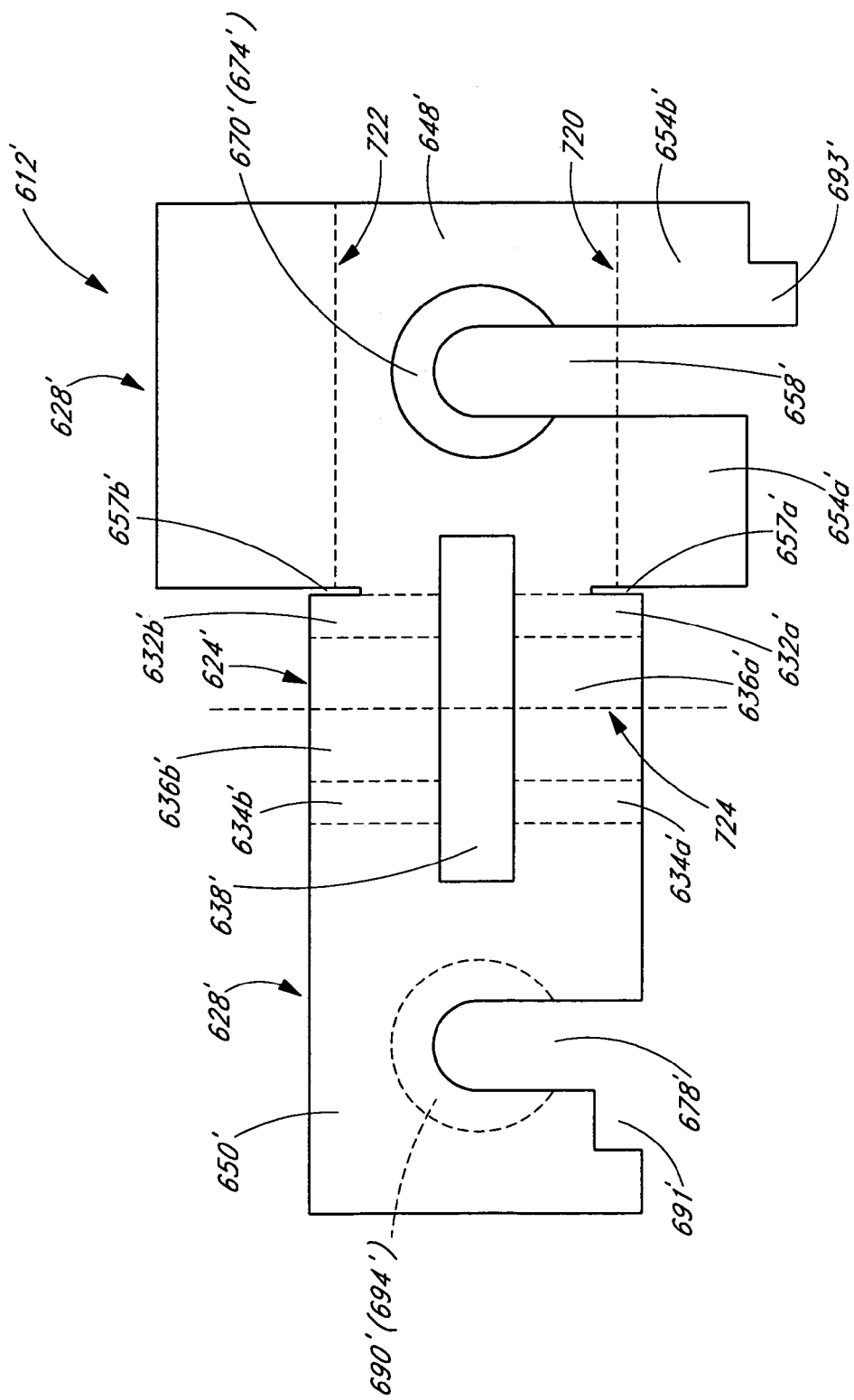
FIG. 23 is a simplified depiction of some acts during manufacture of the retrofit connector of FIG. 17 illustrating features and advantages in accordance with one embodiment of the invention.
Figure 24:
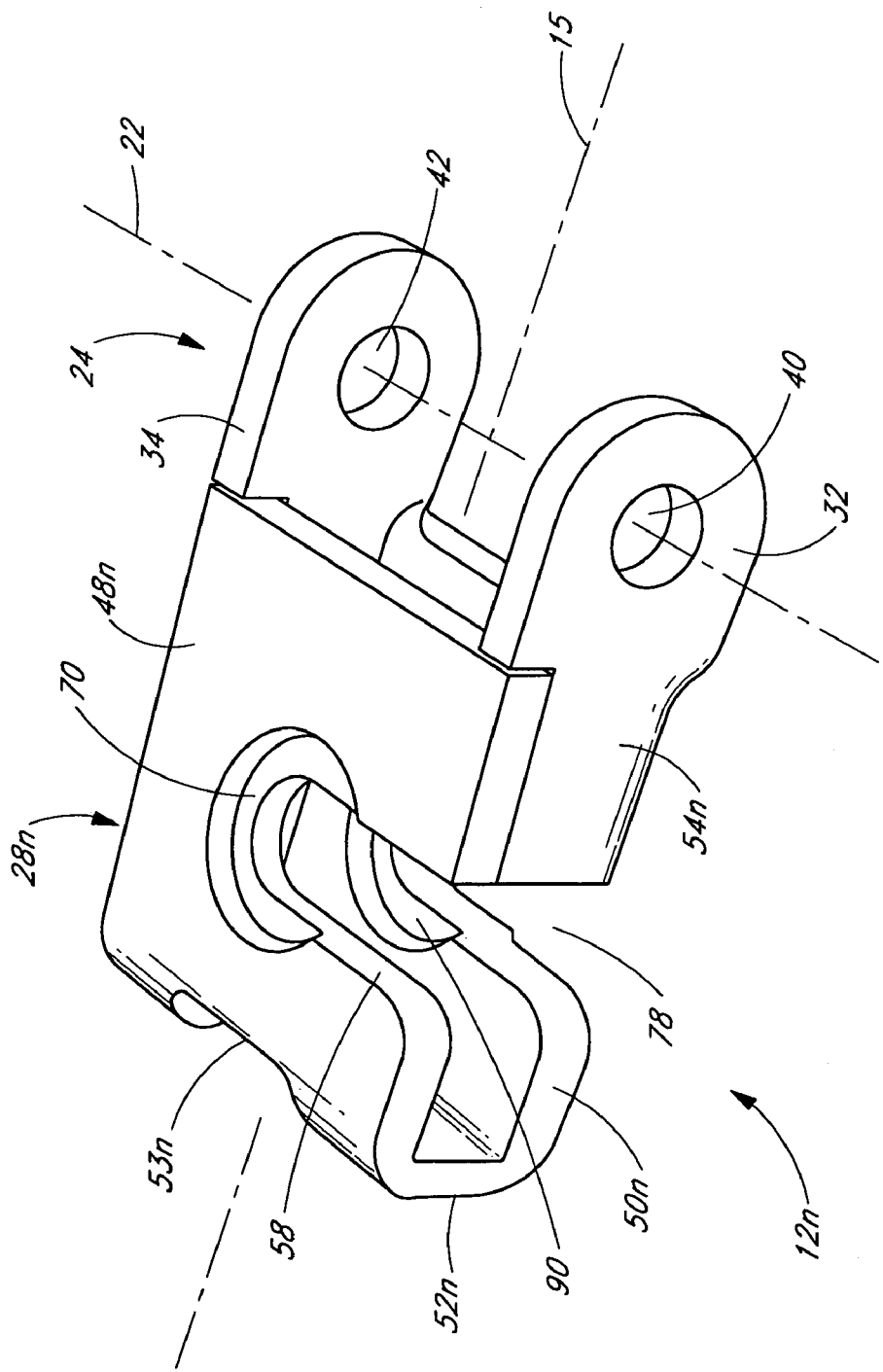
FIG. 24 is a simplified perspective view of yet another retrofit connector illustrating features and advantages in accordance with one embodiment of the invention.

In one embodiment, and referring in particular to FIG. 23, the connector 612 is manufactured by stamping a generally flat strip of material. Preferably, the material comprises a metal, such as mild steel or carbon steel. A suitable cutting-die is used to perform the stamping operations and the like.

In the illustrated embodiment of FIG. 23, a strip (e.g. rectangular or the like) is stamped into a generally T-shaped plate 612' with a proximal portion 624' and a distal or main body portion 628'. In FIG. 23, elements with primed reference numerals correspond to associated elements of the connector 612 (FIGS. 17-22).

Referring in particular to FIG. 23, the stamping or blanking includes forming proximal walls, sections or portions 632a', 634a', 636a', 632b', 634b', 636b', side walls, sections or portions 654a', 654b', 656' and main walls, sections or portions 648', 650'. The stamping also includes forming recess 691' of the main wall 650' and portion 693' of the side wall 654b'.

In one embodiment, the stamping includes forming gaps 657a', 657b'. In another embodiment, the gaps 657a', 657b' are formed by another operation such as shearing or the like which is an independent step, either simultaneous with the stamping or before or after the stamping.

In one embodiment, the stamping includes forming slots 658', 678'. In another embodiment, the slots 658', 678' are formed by punching which is an independent step, either simultaneous with the stamping or before or after the stamping.

In one embodiment, the stamping includes forming slot 638'. In another embodiment, the slot 638' is formed by punching which is an independent step, either simultaneous with the stamping or before or after the stamping.

Still referring in particular to FIG. 23, the recesses 670', 690' are formed by coining which also creates the corresponding protrusions 674', 694'. In one embodiment, coining is the squeezing of metal or other material while it is confined in a closed set of dies to form the desired features, for example, by the action of a punch.

In the illustrated embodiment of FIG. 23, the plate 612' is bent by a predetermined angle (in this case, about 180°) around or about a predetermined line, axis or band 724 to form the proximal walls 632a, 634a, 636a, 632b, 634b, 636b and the distal portion upper and lower walls 648, 650 with corresponding aligned slots 658, 678. The plate 612' is also bent by a predetermined angle (in this case, about 90°) around or about predetermined lines, axes or bands 720 and 722 to form passage 640 and the distal portion side walls 654a, 654b, 656 with the side wall portion 693 aligned with and received within the lower wall recess 691.

The bending operations can result in some degree of spring-back though, in some embodiments, the spring-back is minimized. The associated bend allowance and bending pressure can be calculated for bending and forming operations. Alternatively, or in addition, test runs can be conducted to determine these values under realistic conditions.

As indicated above, the gaps 657a, 657b, 700, 702, 706a, 706b, 710 in some embodiments, minimized by utilizing suitable bending procedures. As also indicated above, in some embodiments, the gaps 706a, 706b, 710 are utilized for visual verification of proper installation torque and substantially close when the retrofit connector 62 is installed.

This generally completes the construction of the connector 62 (FIGS. 17-22). The order of performing the steps to fabricate the connector 612 may not necessarily follow in the order discussed above, but may be selected in any suitable manner, as needed or desired. The retrofit connector or yoke 612 is subsequently connected to a suitable clamp or fitting, as needed or desired and as discussed herein and above.

Advantageously, the connector 612 (FIGS. 17-22) of some embodiments comprises an integral unit or yoke. Thus, a single cutting-die may be used to contour it to the desired shape as compared to having multiple dies to form discrete, and possibly differently shaped, pieces which would than require assembly. Advantageously, this saves on cost.

The manufacturing process or method of the illustrated embodiment of FIG. 23 is especially suited for automated assembly lines, wherein stamping, punching, coining and bending operations can be performed at high speeds and pick-and-place robotic arms or systems can be used to efficiently manipulate the workpieces. The simplicity and speed of this manufacturing method results in an end product that is economical to manufacture, and thus is desirably inexpensive. In a modified embodiment, the connector 12 is manufactured by casting or molding.

The utility and versatility of the retrofit connector 612 and other embodiments as taught or suggested herein will be readily apparent to those skilled in the art. The connector 612 is attachable to an existing system supporting a suspended load below a ceiling, beam, floor or the like without the need to disassemble or disconnect any components of the system, thereby desirably allowing for efficient retrofitting Advantageously, the connector 612 is easy to install and inexpensive to manufacture. The connector 612 is removably or permanently attachable to a sway brace clamp or attachment to form a connector-clamp assembly. The assembly is advantageously capable of reliably supporting heavy loads against adverse sway and seismic disturbances. Desirably, the connector 612 is easily installable and also easily removable. For example, it may be used in a new installation as well and subsequently be removed or replaced, as needed or desired.

The seismic retrofit connector 612 can be utilized in conjunction with a wide variety of fittings and clamps some of which are discussed herein and some are incorporated by reference herein. The skilled artisan will appreciate that the retrofit connector 612 may efficaciously be used in conjunction with a wide variety of other suitable clamps, fittings, attachments, devices and the like.

Yet Another Retrofit Connector

FIGS. 24-29 show different views of another embodiment of a retrofit attachment connector or yoke 12n. The retrofit connector 12n is similar to the connector 12 (FIGS. 1-6) except for certain features shown in FIG. 24-29 some of which are described further below. Like reference numerals in FIGS. 24-29 and 30 refer to like elements of the connector 12 (FIGS. 1-6).

The retrofit yoke or connector 12n has a generally longitudinal axis 15 and is preferably rotatable, pivotable or swivelable about a rotation, pivot or swivel axis 22 with the axes 15 and 22 being generally perpendicular to one another. As discussed above in connection with embodiments of the connector 12, the seismic earthquake brace connector 12n is attachable to a rod or bolt of an already installed system supporting a suspended load, such as a pipe and the like, without disassembly of the existing system.

The retrofit connector 12n (FIGS. 24-29) is attachable to a wide variety of suitable clamps, fittings; attachments, yokes and the like, including those disclosed, taught or suggested herein and above in connection with embodiments of the connector 12. These clamps or devices are securely attachable to a brace, such as a bracing pipe, bracing cable and the like, to protect the suspended load against adverse sway and seismic disturbances. The retrofit connector 12n can be used in conjunction with any of the clamp and installation embodiments (for example those of FIGS. 8-16) as disclosed, taught or suggested herein and above.

In the illustrated embodiment of FIGS. 24-29, the retrofit connector 12n comprises the proximal section 24 and a modified distal or main body portion 28n. The distal portion 28n generally comprises a pair of generally horizontal walls or jaws 48n, 50n spaced by a distal end wall 52n and a pair of generally vertical side walls 54n, 56n spaced by the horizontal wall 50n. The upper wall 48n and lower wall 50n extend substantially parallel to one another. The end wall 52n extends generally perpendicular to the longitudinal axis 15 and generally parallel to the rotation axis 22. The side walls 54n, 56n are generally parallel to one another and extend generally parallel to the longitudinal axis 15 and generally perpendicular to the rotation axis 22.

In the illustrated embodiment of FIGS. 24-29, the proximal walls 32, 34 are mechanically connected or in mechanical communication with the lower wall 50n. The upper wall 48n forms a gap 100n with the proximal side wall 32 and a gap 102n with the proximal side wall 34. The upper wall 48n forms a gap 106n with the distal side wall 54n and a gap 110n with the distal side wall 56n.

In one embodiment, the gaps 100n, 102n have a size of about 1.6 mm ($1/16^{th}$ of an inch). In another embodiment, the gaps 100n, 102n have a size in the range from about 0.8 mm ($1/32^{nd}$ of an inch) to about 3.2 mm ($1/8^{th}$ of an inch), including all values and sub-ranges therebetween. In modified embodiments, other suitable dimensions may be efficaciously utilized, as needed or desired.

In one embodiment, the gaps 106n and 110n have a size of about 1.6 mm ($1/16^{th}$ of an inch). In another embodiment, the gaps 106n and 110n have a size in the range from about 0.8 mm ($1/32^{nd}$ of an inch) to about 3.2 mm ($1/8^{th}$ of an inch), including all values and sub-ranges therebetween. In modified embodiments, other suitable dimensions may be efficaciously utilized, as needed or desired.

In some embodiments, the retrofit connector 12n advantageously provides a visual verification of proper installation torque. During installation, tightening of an existing nut on the hanger rod (e.g., rod 142) substantially completely closes the small gaps 106n, 110n to indicate proper torque installation. The upper wall 48n is displaced (and/or the lower wall 50n) to close the gaps 106n, 110n on application of a predetermined torque or force.

In embodiments of a stacked configuration of connectors 12n, closure of one or both sets of gaps 106n, 110n can be used as a visual indicator of proper installation torque. In a modified embodiment, closure of a small gap between stacked connectors 12n may be used as a visual indicator of proper installation torque.

In the illustrated embodiment of FIGS. 24-29, the side wall 56n is longer than the side wall 54n and the distal end wall 52n has a generally rectangular or square through opening, aperture or window 53n. This selectively adds and removes material with respect to the connector 12 (FIGS. 1-6) to keep, in one embodiment, the weight of the connectors 12 and 12n about the same. The configuration of the walls 56n, 52n may also selectively adjust the structural strength at portions of the connector 12n. This may also be beneficial in designing embodiments of the visual verification feature for proper installation torque. The opening 53n may also provide desired clearance space.

The connector 12n (FIGS. 24-29) of embodiments of the invention can be manufactured or fabricated by a wide variety of methods and/or technologies. These include, without limitation, stamping/punching, casting, molding, forging, machining, combinations thereof, among others.

Figure 30:
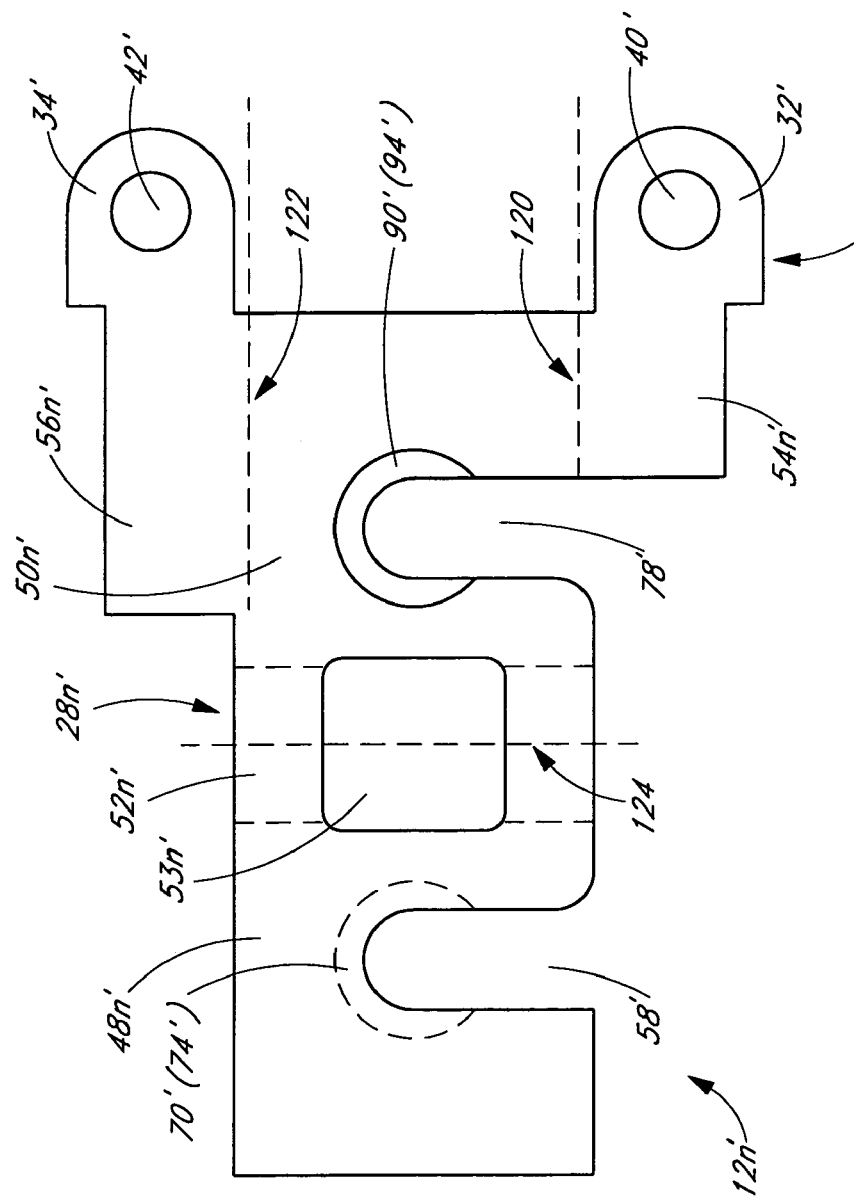
FIG. 30 is a simplified depiction of some acts during manufacture of the retrofit connector of FIG. 24 illustrating features and advantages in accordance with one embodiment of the invention.

In one embodiment, and referring in particular to FIG. 30, the connector 12n is manufactured by stamping a generally flat strip of material. Preferably, the material comprises a metal, such as mild steel or carbon steel. A suitable cutting-die is used to perform the stamping operations and the like.

In the illustrated embodiment of FIG. 30, a strip (e.g. rectangular or the like) is stamped into a generally T-shaped plate 12n' with a proximal portion 24' and a distal or main body portion 28n'. In FIG. 30, elements with primed reference numerals correspond to associated elements of the connector 12n (FIGS. 24-29).

Referring in particular to FIG. 30, the stamping or blanking includes forming side walls, sections or portions 32', 34', side walls, sections or portions 54n', 56n', distal wall, section or portion 52n' and main walls, sections or portions 48n', 50n'. In one embodiment, the stamping includes forming slots 58', 78'. In another embodiment, the slots 58', 78' are formed by punching which is an independent step, either simultaneous with the stamping or before or after the stamping.

In one embodiment, the stamping includes the step of punching holes 40', 42'. In another embodiment, the holes 40', 42' are formed by punching which is an independent step, either simultaneous with the stamping or before or after the stamping.

In one embodiment, the stamping includes the step of punching opening 53n'. In another embodiment, the opening 53n' is formed by punching which is an independent step, either simultaneous with the stamping or before or after the stamping.

Still referring in particular to FIG. 30, the recesses 70', 90' are formed by coining which also creates the corresponding protrusions 74', 94'. In one embodiment, coining is the squeezing of metal or other material while it is confined in a closed set of dies to form the desired features, for example, by the action of a punch.

In the illustrated embodiment of FIG. 30, the plate 12n' is bent by a predetermined angle (in this case, about 90°) around or about predetermined lines, axes or bands 120 and 122 to form the proximal portion side walls 32, 34 with corresponding aligned holes 40, 42 and distal portion side walls 54n, 56n. The plate 12n' is also bent by a predetermined angle (in this case, about 180°) around or about a predetermined line, axis or band 124 to form the distal end wall 52n and the distal portion upper and lower walls 48n, 50n with corresponding aligned slots 58, 78. This bending operation around location 124 can also comprise two bending steps. For example, a first bend of about 90° to form the lower wall 50n and a second bend of about 90° to form the end wall 52n and the upper wall 48n and to align the upper and lower slots 58, 78.

The bending operations can result in some degree of spring-back though, in some embodiments, the spring-back is minimized. The associated bend allowance and bending pressure can be calculated for bending and forming operations. Alternatively, or in addition, test runs can be conducted to determine these values under realistic conditions.

The gaps 100n, 102n, 106n, 110n, in some embodiments, minimized by utilizing suitable bending procedures. As indicated above, in some embodiments, the gaps 106n, 110n are utilized for visual verification of proper installation torque and substantially close when the retrofit connector 12n is installed.

This generally completes the construction of the connector 12n (FIGS. 24-29). The order of performing the steps to fabricate the connector 12n may not necessarily follow in the order discussed above, but may be selected in any suitable manner, as needed or desired. The retrofit connector or yoke 12n is subsequently connected to a suitable clamp or fitting, as needed or desired, and as discussed herein and above.

Advantageously, the connector 12n (FIGS. 24-29) of some embodiments comprises an integral unit or yoke. Thus, a single cutting-die may be used to contour it to the desired shape as compared to having multiple dies to form discrete, and possibly differently shaped, pieces which would than require assembly. Advantageously, this saves on cost.

The manufacturing process or method of the illustrated embodiment of FIG. 30 is especially suited for automated assembly lines, wherein stamping, punching, coining and bending operations can be performed at high speeds and pick-and-place robotic arms or systems can be used to efficiently manipulate the workpieces. The simplicity and speed of this manufacturing method results in an end product that is economical to manufacture, and thus is desirably inexpensive. In a modified embodiment, the connector 12n is manufactured by casting or molding.

The utility and versatility of the retrofit connector 12n and other embodiments as taught or suggested herein will be readily apparent to those skilled in the art. The connector 12n is attachable to an existing system supporting a suspended load below a ceiling, beam, floor or the like without the need to disassemble or disconnect any components of the system, thereby desirably allowing for efficient retrofitting Advantageously, the connector 12n is easy to install and inexpensive to manufacture. The connector 12n is removably or permanently attachable to a sway brace clamp or attachment to form a connector-clamp assembly. The assembly is advantageously capable of reliably supporting heavy loads against adverse sway and seismic disturbances. Desirably, the connector 12n is easily installable and also easily removable. For example, it may be used in a new installation as well and subsequently be removed or replaced, as needed or desired.

The seismic retrofit connector 12n can be utilized in conjunction with a wide variety of fittings and clamps some of which are discussed herein and some are incorporated by reference herein. The skilled artisan will appreciate that the retrofit connector 12n may efficaciously be used in conjunction with a wide variety of other suitable clamps, fittings, attachments, devices and the like.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

From the foregoing description, it will be appreciated that a novel approach for retrofit installation has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using and medical applications for the same will be apparent to those of skill in the art. Accordingly, it should be understood that various applications, modifications, and substitutions may be made of equivalents without departing from the spirit of the invention or the scope of the claims.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the appended claims, including the full range of equivalency to which each element thereof is entitled.

What is claimed is:

1. A connector for retrofit attachment to a threaded rod extending from a support structure for supporting a suspended load against sway and seismic disturbances, the connector comprising:

a longitudinal axis and a pivot pin defining a rotation axis generally perpendicular to said longitudinal axis;

a proximal portion pivotally attached to said pivot pin and having a passage through which said pivot pin passes;

a body portion formed as a single piece with said proximal portion, the body portion comprising:

a generally rectangular upper wall having a first top surface, a first bottom surface, a first side edge and a first slot extending from said first edge, said first slot being generally rectangular in shape and configured to slidingly receive said threaded rod, said first slot having a first open end at said first edge and a first closed end spaced from said first open end and being generally curved to abut against said threaded rod, said upper wall having a first recess on said top surface for matingly interlocking with a nut threadably engaged with said threaded rod, said first recess being generally curved and generally circumscribing said first closed end, said upper wall having a generally curved first protrusion on said first bottom surface substantially aligned with said first recess and generally circumscribing said first closed end;

a generally rectangular lower wall having a second top surface, a second bottom surface, a second side edge positioned to the same side of said second top surface as said first edge and a second slot extending from said second edge, said second slot being generally aligned with said first slot, said second slot being generally rectangular in shape and configured to slidingly receive said threaded rod, said second slot having a second open end at said second edge and a second closed end spaced from said second open end and being generally curved to abut against said threaded rod;

a pair of side walls spacing said upper and lower walls by a predetermined distance; and said upper and lower walls and said side walls being formed as a single piece with one another.

2. The connector of claim 1, wherein said proximal portion comprises a pair of aligned holes through which said pivot pin extends.

3. The connector of claim 2, wherein said proximal portion comprises a pair of spaced side walls with each of said side walls of said proximal portion having a respective one of said holes.

4. The connector of claim 1, wherein said passage of said proximal portion is generally U-shaped.

5. The connector of claim 1, wherein said upper and lower walls are oriented substantially parallel to one another.

6. The connector of claim 1, wherein said lower wall comprises a second protrusion to facilitate alignment and mating between said connector and a second substantially similar connector arranged in a stacked configuration.

7. The connector of claim 1, wherein said connector further comprises an end wall.

8. The connector of claim 1, wherein said connector comprises at least one end wall that spaces said upper and lower walls.

* * * * *